US011054375B2

(12) United States Patent
Seidler et al.

(10) Patent No.: US 11,054,375 B2
(45) Date of Patent: Jul. 6, 2021

(54) X-RAY SPECTROMETER AND METHODS FOR USE

(71) Applicant: UNIVERSITY OF WASHINGTON, Seattle, WA (US)

(72) Inventors: Gerald Todd Seidler, Seattle, WA (US); Oliver Hoidn, Seattle, WA (US); William Holden, Seattle, WA (US)

(73) Assignee: UNIVERSITY OF WASHINGTON, Seattle, WA (US)

(*) Notice: Subject to any disclaimer, the term of this patent is extended or adjusted under 35 U.S.C. 154(b) by 236 days.

(21) Appl. No.: 16/333,405

(22) PCT Filed: Sep. 15, 2017

(86) PCT No.: PCT/US2017/051789
§ 371 (c)(1),
(2) Date: Mar. 14, 2019

(87) PCT Pub. No.: WO2018/053272
PCT Pub. Date: Mar. 22, 2018

(65) Prior Publication Data
US 2019/0257774 A1 Aug. 22, 2019

Related U.S. Application Data
(60) Provisional application No. 62/394,981, filed on Sep. 15, 2016.

(51) Int. Cl.
*G01N 23/207* (2018.01)
*G01N 23/20025* (2018.01)
(Continued)

(52) U.S. Cl.
CPC ....... *G01N 23/2076* (2013.01); *G01N 23/207* (2013.01); *G01N 23/20008* (2013.01);
(Continued)

(58) Field of Classification Search
CPC ............ G21K 1/00; G21K 1/06; G21K 1/062; G21K 1/065; G21K 2201/00;
(Continued)

(56) References Cited

U.S. PATENT DOCUMENTS

| 4,091,282 A | 5/1978 | Anisovich et al. |
| 4,134,012 A | 1/1979 | Smallbone et al. |

(Continued)

FOREIGN PATENT DOCUMENTS

| JP | 2002/214165 A | 7/2002 |
| JP | 2002214165 A | 7/2002 |

OTHER PUBLICATIONS

"Rowland Circle Geometry based X-ray Spectrometer Alignment Guide," XRS Tech LLC, May 23, 2012, 3 pages.
(Continued)

*Primary Examiner* — Anastasia Midkiff
(74) *Attorney, Agent, or Firm* — McDonnell Boehnen Hulbert & Berghoff LLP

(57) ABSTRACT

A spectrometer includes a crystal analyzer having a radius of curvature that defines a Rowland circle, a sample stage configured to support a sample such that the sample is offset from the Rowland circle, an x-ray source configured to emit unfocused x-rays toward the sample stage, and a position-sensitive detector that is tangent to the Rowland circle. A method performed via a spectrometer includes emitting, via an x-ray source, unfocused x-rays toward a sample that is mounted on a sample stage such that the sample is offset from the Rowland Circle, thereby causing the sample to emit x-rays that impinge on the crystal analyzer or transmit a portion of the unfocused x-rays to impinge on the crystal analyzer; scattering, via the crystal analyzer, the x-rays that
(Continued)

impinge on the crystal analyzer; and detecting the scattered x-rays via a position-sensitive detector that is tangent to the Rowland circle.

20 Claims, 14 Drawing Sheets

(51) Int. Cl.
    *G01N 23/20091*      (2018.01)
    *G01N 23/20008*      (2018.01)
    *G01T 7/10*      (2006.01)
    *G02B 26/08*      (2006.01)
    *G01T 1/29*      (2006.01)
    *G02B 27/09*      (2006.01)
    *G01N 23/20*      (2018.01)

(52) U.S. Cl.
    CPC . *G01N 23/20025* (2013.01); *G01N 23/20091* (2013.01); *G01N 23/20* (2013.01); *G01N 2223/052* (2013.01); *G01N 2223/307* (2013.01); *G01N 2223/309* (2013.01); *G01N 2223/32* (2013.01); *G01N 2223/5015* (2013.01); *G01N 2291/045* (2013.01); *G01T 1/2978* (2013.01); *G01T 7/10* (2013.01); *G02B 26/0816* (2013.01); *G02B 27/0983* (2013.01); *G21K 2201/062* (2013.01); *G21K 2201/064* (2013.01)

(58) Field of Classification Search
    CPC ......... G21K 2201/06; G21K 2201/061; G21K 2201/062; G21K 2201/064; G21K 2201/067; G01B 9/10; G02B 5/126; G02B 26/08; G02B 26/0816; G02B 26/0875; G02B 27/0977; G02B 27/0983; G01T 1/29; G01T 1/2914; G01T 1/2978; G01T 7/02; G01T 7/08; G01T 7/10; G01N 23/20; G01N 23/20008; G01N 23/20016; G01N 23/20025; G01N 23/20083; G01N 23/205; G01N 23/2055; G01N 23/207; G01N 23/2076; G01N 2223/05; G01N 2223/052; G01N 2223/054; G01N 2223/30; G01N 2223/306; G01N 2223/309; G01N 2223/32; G01N 2291/045; G01N 2291/056

See application file for complete search history.

(56) References Cited

U.S. PATENT DOCUMENTS

| | | | |
|---|---|---|---|
| 4,807,268 | A | 2/1989 | Wittry |
| 5,128,545 | A | 7/1992 | Komi |
| 5,381,458 | A | 1/1995 | Deslattes |
| 6,389,102 | B2 | 5/2002 | Mazor et al. |
| 6,459,767 | B1 | 10/2002 | Boyer |
| 6,934,359 | B2 | 8/2005 | Chen et al. |
| 7,206,375 | B2 | 4/2007 | Chen et al. |
| 7,298,817 | B2 | 11/2007 | Chen et al. |
| 7,427,757 | B1 | 9/2008 | Janik et al. |
| 7,899,154 | B2 | 3/2011 | Chen et al. |
| 9,001,968 | B2 | 4/2015 | Kugland et al. |
| 9,116,107 | B2 | 8/2015 | Goto et al. |
| 2010/0046702 | A1 | 2/2010 | Chen et al. |
| 2011/0007869 | A1 | 1/2011 | Gendreau et al. |
| 2011/0268252 | A1 | 11/2011 | Ozawa et al. |
| 2013/0034204 | A1 | 2/2013 | Matoba et al. |
| 2013/0138382 | A1 | 5/2013 | Mitsunaga et al. |
| 2015/0330918 | A1 | 11/2015 | Kim et al. |
| 2019/0011381 | A1 | 1/2019 | Mortensen et al. |

OTHER PUBLICATIONS

Abe, K. et al., "Design and performance of the SLD vertex detector: a 307 Mpixel tracking system," Nuclear Instruments and Methods in Physics Research A 400 (1997) 287-343.

Alonso-Morei, R. et al., "Energy-dispersive X-ray emission spectroscopy using an X-ray free-electron laser in a shot-by-shot mode," PNAS, Nov. 20, 2012, 109:47, p. 19103-19107.

Anklamm, L. et al., "A novel von Hamos spectrometer for efficient X-ray emission spectroscopy in the laboratory," Rev. Sci. Instrum. 85, 053110 (2014).

Baggetto, L. et al., "In situ X-ray absorption spectroscopy of germanium evaporated thin film electrodes," Electrochimica Acta 55 (2010) 7074-7079.

Bare, S. R. et al., "Characterizing industrial catalysts using in situ XAFS under identical Conditions," Phys. Chem. Chem. Phys., 2010, 12, 7702-7711.

Benesch et al., "Ultrafast laser-driven x-ray spectrometer for x-ray absorption spectroscopy of transition metal complexes," Optics Letters, 29:9, May 1, 2004, p. 1028-1030.

Bergmann, U. et al., "Characterization of the Mn Oxidation States in Photosystem II by Kå X-ray Fluorescence Spectroscopy," J. Phys. Chem. B 1998, 102, 8350-8352.

Bergmann, U. et al., "High Resolution K Capture X-ray Fluorescence Spectroscopy: A New Tool for Chemical Characterization," J. Am. Chem. Soc. 1999, 121, 4926-4927.

Bergmann, U. et al., "X-ray emission spectroscopy," Photosynth Res (2009) 102:255-266.

Bolin, T. B. et al., "In situ intermediate-energy X-ray catalysis research at the advanced photon source beamline 9-BM," Catalysis Today 205 (2013) 141-147.

Borkowski, C. J. et al., "Design and properties of position-sensitive proportional counters using resistance-capacitance position encoding," Review of Scientific Instruments 46:8, 951-962 (1975).

Borkowski, C. J. et al., "New Type of Position-Sensitive Detectors of Ionizing Radiation Using Risetime Measurement" Review of Scientific Instruments 39:10, 1515-1522 (1968).

Bowden et al., "X-ray absorption measurements on nickel cathode of sodium-beta alumina batteries: Fe—Ni—Cl chemical associations" Journal of Power Sources 247 (2014) 517e526.

Brennan et al., "Performance of a tuneable secondary x-ray spectrometer," Review of Scientific Instruments 60:7, 2243-2246 (1989).

Buschert, R. et al., "Laboratory EXAFS in a Dispersive Mode," J. Appl. Cryst. (1988) 21, 79-85.

Chan H. et al., "Valence change by in situ XAS in surface modified LiMn2O4 for Li-ion battery," Electrochemistry Communications 8 (2006) 1731-1736.

Chen W. et al., "Hydrogen-Evolution Catalysts Based on Non-Noble Metal Nickel-Molybdenum Nitride Nanosheets," Angrew. Chem. Int. Ed. 2012, 51, 6131-6135.

Cohen, G. G. et al., "Tunable laboratory extended x-ray absorption fine structure system," Review of Scientific Instruments 51(3), 273-277 (1980).

Collart, E. et al., "Spherically bent analyzers for resonant inelastic X-ray scattering with intrinsic resolution below 200 meV," J. Synchrotron Rad. (2005). 12, 473-478.

Covita, D. S. et al., "Accurate miscut angle determination for spherically bent Bragg crystals," Rev. Sci. Instrum. 79, 033102 (2008).

Croy, J. R. et al., "Designing High-Capacity, Lithium-Ion Cathodes Using X-ray Absorption Spectroscopy," Chem. Mater. 2011, 23, 5415-5424.

Davis, K. M. et al., "Fast Detection Allowing Analysis of Metalloprotein Electronic Structure by X-ray Emission Spectroscopy at Room Temperature," J. Phys. Chem. Lett. 2012, 3, 1858-1864.

Davis, K. M. et al., "Kinetic Modeling of the X-ray-Induced Damage to a Metalloprotein" J. Phys. Chem. B 2013, 117, 9161-9169.

De Combarieu, G. et al., "In situ Fe XAFS of reversible lithium insertion in a flexible metal organic framework material," Electrochemistry Communications 11 (2009) 1881-1884.

(56) References Cited

OTHER PUBLICATIONS

De Jonge, M. D. et al., "X-ray bandwidth: Determination by on-edge absorption and effect on various absorption experiments," Physical Review A 69, 022717 (2004).
Deb, A. et al, "In situ x-ray absorption spectroscopic study of the Li[Ni1/3Co1/3Mn1/3]O2 cathode material," J. Appl. Phys. 97f, 113523 (2005).
Deb, A. et al, "Structural Investigations of LiFePO4 Electrodes by Fe X-ray Absorption Spectroscopy," J. Phys. Chem. B 2004, 108, 7046-7051.
Deb, A. et al., "In Situ X-Ray Absorption Spectroscopic Study of Li1.05Ni0.35Co0.25Mn0.4O2 Cathode Material Coated with LiCoO2," Journal of The Electrochemical Society, 154 (6) A534-A541 (2007).
Deb A. et al., "In situ X-ray absorption spectroscopy—A probe of cathode materials for Li-ion cells," Fluid Phase Equilibria 241 (2006) 4-19.
Deb, A. et al., "X-ray absorption spectroscopy study of the LixFePO4 cathode during cycling using a novel electrochemical in situ reaction cell," J. Synchrotron Rad. (2004) 11, 497-504.
Delgado-Jaime, M. U. et al., "Valence-to-Core X-Ray Emission Spectroscopy of Iron-Carbonyl Complexes: Implications for the Examination of Catalytic Intermediates," Chem. Eur. J. 2013, 19, 15888-15897.
Deshpande, S. K. et al., "An automated laboratory EXAFS spectrometer of Johansson type: indigenous development and testing," J. Phys., vol. 37, No. 4, Oct. 1991, pp. 373-385.
Deslattes, R. D. et al., "Double Monochromator Systems for the Study of Multiple Vacancy Processes," Nuclear Instruments and Methods, 152 (1978) 179-183.
Deslattes, R. D., "X-Ray Fluorescence Spectroscopy," Nuclear Instruments and Methods 208 (1983) 655-658.
Dickinson, B., et al., "A short working distance multiple crystal x-ray spectrometer," Rev. Sci. Instrum. 79, 123112 (2008).
Dolgih, V. E. et al., "X-Ray Fluorescent Spectrometer with Linear Position Sensitive Detector," Nuclear Instruments and Methods in Physics Research 224 (1984) 117-119.
Dominko, R. et al., "In-situ XAS study on Li2MnSiO4 and Li2FeSiO4 cathode materials," Journal of Power Sources 189 (2009) 51-58.
Duval, B. P. et al., "Position-Sensitive X-Ray Detector," Nuclear Instruments and Methods in Physics Research 222 (1984) 274-278.
Falcone, A. D. et al., "Hybrid CMOS x-ray detectors: the next generation for focused x-ray telescopes," Proceedings of SPIE—The International Society for Optical Engineering 6686 Sep. 2007.
Fister, T. T. et al., "Multielement spectrometer for efficient measurement of the momentum transfer dependence of inelastic x-ray scattering," Rev. Sci. Instrum. 77, 063901 (2006).
Frenkel, A. I. "Applications of extended X-ray absorption fine-structure spectroscopy to studies of bimetallic nanoparticle catalysts," Chem. Soc. Rev., 2012, 41, 8163-8178.
Frenkel, A. I. et al., "Critical review: Effects of complex interactions on structure and dynamics of supported metal catalysts," Journal of Vacuum Science & Technology A 32, 020801 (2014).
Frenkel, A. I., "Synchrotron Techniques for In Situ Catalytic Studies: Capabilities, Challenges, and Opportunities," ACS Catal. 2012, 2, 11, 2269-2280.
Gallo, E. et al., "Valence to Core X-ray Emission Spectroscopy," Adv. Mater. 2014, 26, 7730-7746.
Gamboa, E. J. et al., "Imaging x-ray Thomson scattering spectrometer design and demonstration (invited)," Rev. Sci. Instrum. 83, 10E108 (2012).
Gao, X. et al., "A high-resolution X-ray fluorescence spectrometer and its application at SSRF," X-Ray Spectrom. 2013, 42, 502-507.
Georgopoulos, P. et al., "Design Criteria for a Laboratory EXAFS Facility," J. Appl. Cryst. (1981). 14, 3-7.
Glatzel, P. et al., "High resolution 1s core hole X-ray spectroscopy in 3d transition metal complexes-electronic and structural information," Coordination Chemistry Reviews 249 (2005) 65-95.
Glatzel, P. et al., "Influence of the core hole on Kβ emission following photoionization or orbital electron capture: A comparison using MnO and 55Fe2O3," Physical Review B, vol. 64, 045109.
Glatzel, P. et al., "Multiple excitations in the K fluorescence emission of Mn, Fe and Ni compounds," AIP Conf. Proc. 652, 250 (2002).
Glover, J. L. et al., "The analysis of x-ray absorption fine structure: beam-line independent interpretation," Meas. Sci. Technol. 18 (2007) 2916-2920.
Gog, T. et al., "Spherical analyzers and monochromators for resonant inelastic hard X-ray scattering: a compilation of crystals and reflections," J. Synchrotron Rad. (2013). 20, 74-79.
Grunwaldt, J. et al., "Combining XRD and EXAFS with on-line catalytic studies for in situ characterization of catalysts," Topics in Catalysis vol. 18, Nos. 1-2, Jan. 2002.
Grunwaldt, J. et al., "X-ray absorption spectroscopy on heterogeneous catalysts at the new XAS beamline at ANKA," Physica Scripta. vol. T115, 769-772, 2005.
Hannemann, S. et al., "A versatile in situ spectroscopic cell for fluorescence/transmission EXAFS and X-ray diffraction of heterogeneous catalysts in gas and liquid phase," J. Synchrotron Rad. (2007). 14, 345-354.
Hayakawa, S. et al., "X-ray Absorption Near Edge Structure Study on Valence Changes of Ni and Co in Li1-xNi0.82Co0.15M0.03O2 (M=Nb, Ti) Cathode Materials," Electrochemistry, 78:5 (2010) 454-456.
Hazemann, J. et al., "High-resolution spectroscopy on an X-ray absorption beamline," J. Synchrotron Rad. (2009). 16, 283-292.
Henins, A., "Variable radius curved crystal mount," Review of Scientific Instruments 58, 1173 (1987).
Hill, J. P. et al., "A 2 m inelastic X-ray scattering spectrometer at CMC-XOR, Advanced Photon Source," J. Synchrotron Rad. (2007) 14, 361-365.
Hoidn, O. R. et al., "Note: A disposable x-ray camera based on mass produced complementary metaloxide-semiconductor sensors and singleboard computers," Rev. Sci. Instrum. 86, 086107 (2015).
Holzapfel, M. et al., "Effect of iron on delithiation in LixCo1-yFeyO2 Part 2: in-situ XANES and EXAFS upon electrochemical cycling," J. Mater. Chem., 2004, 14, 102-110.
Honkanen, A. et al., "Improving the energy resolution of bent crystal X-ray spectrometers with position-sensitive detectors," J. Synchrotron Rad. (2014) 21, 762-767.
Hoszowska, J. et al., "High-resolution von Hamos crystal X-ray spectrometer," Nuclear Instruments and Methods in Physics Research A 376 (1996) 129-138.
Hudson, A. C. et al., "Design and Performance of a Curved-crystal X-ray Emission Spectrometer," Review of Scientific Instruments 78, 053101 (2007).
Huguenin, F. et al., "XANES study of polyaniline-V2O5 and sulfonated polyaniline-V2O5 nanocomposites," Electrochimica Acta 47 (2002) 3179-3186.
Huotari, S. et al., "Improving the performance of high-resolution X-ray spectrometers with position-sensitive pixel detectors," J. Synchrotron Rad. (2005) 12, 467-472.
Huotari, S. et al., "Resonant inelastic hard x-ray scattering with diced analyzer crystals and position-sensitive detectors," Rev. Sci. Instrum. 77, 053102 (2006).
Inada, Y. et al., "In-laboratory stopped-flow extended x-ray absorption fine structure apparatus in the dispersive mode for determination of the structure of short-lived intermediates," Review of Scientific Instruments 65, 18 (1994).
Inada, Y. et al., "Laboratory Stopped-Flow XAFS Apparatus. Structure Determination of the Short-Lived Peroxochromium Intermediate Formed during Reduction Process of Chromate(VI) Ion by Hydrogen Peroxide," Z. Naturforsch. 52b, 711-718 (1997).
Ito, M. et al., "A Stable In-Laboratory EXAFS Measurement System," Japanese Journal of Applied Physics, 22:2, Feb. 1983, 357-360.
Jiang, Y. et al., "Generation of ultrashort hard-x-ray pulses with tabletop laser systems at a 2-kHz repetition rate," Journal of the Optical Society of America B 20(1):229-237 Jan. 2003.
Jiang, Y. et al., "Ultrafast x-ray absorption spectroscopy: observing the equilibrium structure and structural dynamics of solvated molecules," Proc. SPIE, 4504, 42-48.

(56) References Cited

OTHER PUBLICATIONS

Johnson, C. S., et al., "Li2O Removal from Li5FeO4: A Cathode Precursor for Lithium-Ion Batteries," Chem. Mater. 2010, 22, 1263-1270.

Kageyama, H. et al., "XAFS study of LiCo1-xFexO2 cathode for rechargeable lithium battery by laboratory XAFS spectrometer," J. Synchrotron Rad. (2001) 8, 863-865.

Kao, C. et al., "Optical design and performance of the inelastic scattering beamline at the National Synchrotron Light Source," Review of Scientific Instruments 66, 1699 (1995).

Kavcic, M. et al., "Design and performance of a versatile curved-crystal spectrometer for high-resolution spectroscopy in the tender x-ray range," Rev. Sci. Instrum. 83, 033113 (2012).

Kayser, Y. et al., "Laboratory-based micro-X-ray fluorescence setup using a von Hamos crystal spectrometer and a focused beam X-ray tube," Rev. Sci. Instrum. 85, 043101 (2014).

Khalid, S. et al., "Laboratory EXAFS spectrometer for catalyst studies," Review of Scientific Instruments 53, 22 (1982).

Kleymenov, E., "Five-element Johann-type x-ray emission spectrometer with a single-photon-counting pixel detector," Rev. Sci. Instrum. 82, 065107 (2011).

Knapp, G. S. et al., "A New In-Laboratory XAFS Facility," Physica B 158 (1989) 328-329.

Knapp, G. S. et al., "Development of a laboratory EXAFS facility," Review of Scientific Instruments 49, 1658 (1978).

Kobayashi, H. et al., "Study on Li de-intercalation/intercalation mechanism for a high capacity layered Li1.20Ni0.17Co0.10Mn0.53O2 material," Solid State Ionics 225 (2012) 580-584.

Kobayashi, S. et al., "XANES and EXAFS analysis of nano-size manganese dioxide as a cathode material for lithium-ion batteries," J. Mater Chem., 2004, 14, 1843-1848.

Koyama, K. et al., "X-Ray Imaging Spectrometer (XIS) on Board Suzaku," Publ. Astron. Soc. Japan 59, S23-S33, Jan. 25, 2007.

La Fontaine, C. et al., "X-ray absorption spectroscopy and heterogeneous catalysis: Performances at the Soleil's Samba beamline," Catalysis Today 205 (2013) 148-158.

Lane D., "X-ray imaging and spectroscopy using low cost COTS CMOS sensors," Nuclear Instruments and Methods in Physics Research B 284 (2012) 29-32.

Lecante, P. et al., "A laboratory EXAFS spectrometer in transmission dispersive mode," Review of Scientific Instruments 65, 845 (1994).

Lechner, P., "X-ray imaging spectrometers in present and future satellite missions," Nuclear Instruments and Methods in Physics Research A 509 (2003) 302-314.

Lee, J.C. et al., "Development of multipurpose laboratory XIEES spectrometer and its application to surface XAFS analysis of Al2O3 films," J. Synchrotron Rad. (2001) 8, 360-362.

Lee, N. et al., "Probing Valence Orbital Composition with Iron Kβ X-ray Emission Spectroscopy," J. Am. Chem. Soc. 2010, 132, 9715-9727.

Legall, H. et al., "An efficient X-ray spectrometer based on thin mosaic crystal films and its application in various fields of X-ray spectroscopy," J. Appl. Cryst. (2009) 42, 572-579.

Leriche, J. B. et al., "An Electrochemical Cell for Operando Study of Lithium Batteries Using Synchrotron Radiation," Journal of The Electrochemical Society, 157(5) A606-A610 (2010).

Lindle, D. W. et al., "Polarization of Molecular X-Ray Fluorescence," Physical Review Letters, 60:11, Mar. 1988, 1010-1014.

Llorens, I. et al., "High energy resolution five-crystal spectrometer for high quality fluorescence and absorption measurements on an x-ray absorption spectroscopy beamline," Rev. Sci. Instrum. 83, 063104 (2012).

Love, C. T. et al., "Review of LiFePO4 Phase Transition Mechanisms and New Observations from X-ray Absorption Spectroscopy," Journal of The Electrochemical Society, 160 (5) A3153-A3161 (2013).

Lytle, F. W., "Extended x-ray-absorption fine-structure technique. II. Experimental practice and selected results," Physical Review B 11:12, Jun. 1975, 4825-4835.

Macrander, A. T. et al., "Performance of spherically focusing Ge(444) backscattering analyzers for inelastic x-ray scattering," Review of Scientific Instruments 66, 1546 (1995).

Maddox, B. R. et al., "Calibration and characterization of single photon counting cameras for short-pulse laser axperiments," Rev. Sci. Instrum. 79, 10E924 (2008).

Masciovecchio, C. et al., "A perfect crystal X-ray analyser with meV energy resolution," Nuclear Instruments and Methods in Physics Research B 111 (1996) 181-186.

Stern, E. A. et al., "Extended x-ray-absorption fine-structure technique. III. Determination of physical parameters," Physical Review B, 11:12, Jun. 15, 1975, 4836-4846.

Stierle, A. et al., "Novel In Situ Probes for Nanocatalysis," Mrs Bulletin, vol. 32, Dec. 2007, 1001-1009.

Stojanoff, V. et al., "A high-resolution x-ray fluorescence spectrometer for near-edge absorption studies," Review of Scientific Instruments 63, 1125 (1992).

Sugie, H. et al., "Carbon nanotubes as electron source in an x-ray tube," Appl. Phys. Lett. 78, 2578 (2001).

Suortti, P. et al., "Scanning X-ray spectrometer for high-resolution Compton profile measurements at ESRF," J. Synchrotron Rad. (1999) 6, 69-80.

Szlachetko, M. et al., "High-resolution Laue-type DuMond curved crystal spectrometer," Rev. Sci. Instrum. 84, 093104 (2013).

Tabuchi, M. et al., "Synthesis, Cation Distribution, and Electrochemical Properties of Fe-Substituted Li2MnO3 as a Novel 4 V Positive Electrode Material," Journal of The Electrochemical Society, 149(5) A509-A524 (2002).

Taguchi, T. et al., "A new approach for in-laboratory XAFS equipment," J. Synchrotron Rad. (1999) 6, 170-171.

Taguchi, T. et al., "Customization of an In-House XAFS Spectrometer for Sulfur Measurement," Physica Scripta. vol. T115, 1017-1018, 2005.

Taguchi, T. et al., "Development of a new in-laboratory XAFS apparatus based on new concept," J. Synchrotron Rad. (2001). 8, 363-365.

Terada, Y. et al., "In Situ XAFS Analysis of Li(Mn, M)2O4 (M=Cr, Co, Ni) 5V Cathode Materials for Lithium-Ion Secondary Batteries," Journal of Solid State Chemistry 156, 286-291 (2001).

Thomas, J. M. et al., "The Role of Synchrotron-Based Studies in the Elucidation and Design of Active Sites in Titanium-Silica Epoxidation Catalysts," Acc. Chem. Res. 2001, 34, 571-581.

Thomas, J. M. et al., "The role of XAFS in the in situ and ex situ elucidation of active sites in designed solid catalysts," J. Synchrotron Rad. (2001) 8, 55-60.

Thulke, W. et al., "Versatile curved crystal spectrometer for laboratory extended x-ray absorption fine structure measurements," Review of Scientific Instruments 54, 277 (1983).

Tinnemans, S. J. et al., "Combining operando techniques in one spectroscopic-reaction cell: New opportunities for elucidating the active site and related reaction mechanism in catalysis," Catalysis Today 113 (2006) 3-15.

Tohji, K. et al., "Development of a Laboratory EXAFS Facility," Japanese Journal of Applied Physics, 22:5, May 1983, 882-885.

Tohji, K. et al., "Double-crystal spectrometer for laboratory EXAFS spectroscopy," Review of Scientific Instruments 59, 1127 (1988).

Tohji, K. et al., "Laboratory EXAFS spectrometer with a bent crystal, a solid-state detector, and a fast detection system," Review of Scientific Instruments 54, 1482 (1983).

Tsai, Y. W. et al., "In-Situ X-ray Absorption Spectroscopic Study on Variation of Electronic Transitions and Local Structure of LiNi1/3Co1/3Mn1/3O2 Cathode Material during Electrochemical Cycling," Chem. Mater. 2005, 17, 3191-3199.

Uhlig, J. et al., "High-resolution X-ray emission spectroscopy with transition-edge sensors: present performance and future potential," J. Synchrotron Rad. (2015) 22, 766-775.

Uhlig, J. et al., "Table-Top Ultrafast X-Ray Microcalorimeter Spectrometry for Molecular Structure," PRL 110, 138302 (2013).

Ullom, J. N. et al., "Review of superconducting transition-edge sensors for x-ray and gamma-ray spectroscopy," Supercond. Sci. Technol. 28 (2015) 084003 (36pp).

(56) References Cited

OTHER PUBLICATIONS

Verbeni, R. et al., "Advances in crystal analyzers for inelastic X-ray scattering," Journal of Physics and Chemistry of Solids 66 (2005) 2299-2305.
Verbeni, R. et al., "Multiple-element spectrometer for non-resonant inelastic X-ray spectroscopy of electronic excitations," J. Synchrotron Rad. (2009). 16, 469-476.
Verbeni, R., et al., "X-ray Monochromator with 2 x 10-8 Energy Resolution," J. Synchrotron Rad. (1996). 3, 62-64.
Vura-Weis, J. et al., "Femtosecond M2,3-Edge Spectroscopy of Transition-Metal Oxides: Photoinduced Oxidation State Change in α-Fe2O3," J. Phys. Chem. Lett. 2013, 4, 3667-3671.
Wang, L. et al., "Catalysis and in Situ Studies of Rh1/Co3O4 Nanorods in Reduction of NO with H2," ACS Catal. 2013, 3, 1011-1019.
Welter, E. et al., "A new X-ray spectrometer with large focusing crystal analyzer," J. Synchrotron Rad. (2005). 12, 448-454.
Williams, A., "Laboratory x-ray spectrometer for EXAFS and XANES measurements," Review of Scientific Instruments 54, 193 (1983).
Wittry, D. B. et al., "X-ray optics of doubly curved diffractors II," Journal of Applied Physics 71, 564 (1992).
Yacoby, Y. et al., "Variable Rowland radius laboratory EXAFS system," Review of Scientific Instruments 58, 588 (1987).
Yoon, W. et al., "Electronic structural changes of the electrochemically delithiated LiFe0.5Co0.5PO4 cathode material studied by X-ray absorption spectroscopy," Journal of Power Sources 183 (2008) 427-430.
Yoon, W. et al., "In Situ X-ray Absorption Spectroscopic Study on LiNi0.5Mn0.5O2 Cathode Material during Electrochemical Cycling," Chem. Mater. 2003, 15, 3161-3169.
Yoon, W. et al., "Investigation of the Local Structure of the LiNi0.5Mn0.5O2 Cathode Material During Electrochemical Cycling by X-ray Absorption Spectroscopy," Abstract No. Yoon0398, 4 pages.
Yue, G. Z. et al., "Generation of continuous and pulsed diagnostic imaging x-ray radiation using a carbon-nanotube-based field-emission cathode," Appl. Phys. Lett. 81, 355 (2002).
Yuryev, Y. N. et al., "Laboratory vacuum spectrometer for the soft x-ray region," X-Ray Spectrum. 2008; 37: 476-481.
Yuryev, Y. N. et al., "Variable Rowland radius laboratory vacuum surface-sensitive x-ray absorption fine structure spectrometer," Rev. Sci. Instrum. 78, 025108 (2007).
Zhang, K. et al., "Shrinking the Synchrotron: Tabletop Extreme Ultraviolet Absorption of Transition-Metal Complexes," J. Phys. Chem. Lett. 2016, 7, 3383-3387.
Zhang, W. et al., "In Situ Electrochemical XAFS Studies on an Iron Fluoride High-Capacity Cathode Material for Rechargeable Lithium Batteries," J. Phys. Chem. C 2013, 117, 11498-11505.
Zhang, X. et al., "The Structure-Property Investigation of Bi1-xCexFeO3 (x=0, 0.05)-Li Battery: In Situ XRD and XANES Studies," J. Phys. Chem. C 2012, 116, 20230-20238.
Mattern, B. A. et al., "A plastic miniature x-ray emission spectrometer based on the cylindrical von Hamos geometry," Rev. Sci. Instrum. 83, 023901 (2012).
McLaren, V. L. et al., "Study of the Capacity Fading Mechanism for Fe-Substituted LiCoO2 Positive Electrode," Journal of The Electrochemical Society, 151 (5) A672-A681 (2004).
Menard, M. C. et al., "Variation in the iron oxidation states of magnetite nanocrystals as a function of crystallite size: The impact on electrochemical capacity," Electrochimica Acta 94 (2013) 320-326.
Miaja-Avila, L. et al., "Laser plasma x-ray source for ultrafast time-resolved x-ray absorption spectroscopy," Struct. Dyn. 2, 024301 (2015).
Michail, C. M. et al., "Experimental and Theoretical Evaluation of a High Resolution CMOS Based Detector Under X-Ray Imaging Conditions," IEEE Transactions on Nuclear Science, vol. 58, No. 1, Feb. 2011.

Mori, R. A. et al., "Electronic Structure of Sulfur Studied by X-ray Absorption and Emission Spectroscopy," Anal. Chem. 2009, 81, 6516-6525.
Mori, R. A. et al., "Sulfur-Metal Orbital Hybridization in Sulfur-Bearing Compounds Studied by X-ray Emission Spectroscopy," Inorg. Chem. 2010, 49, 6468-6473.
Mortensen, D. R. et al., "Benchtop Nonresonant X-ray Emission Spectroscopy: Coming Soon to Laboratories and XAS Beamlines Near You?," dissertation 2016 University of Washington.
Mortensen, D. R. et al., Benchtop Nonresonant X-ray Emission Spectroscopy: Coming Soon to Laboratories and XAS Beamlines Near You? 2016 J. Phys.: Conf. Ser. 712.
Mortensen, D. R. et al., "Robust optic alignment in a tilt-free implementation of the Rowland circle spectrometer," Journal of Electron Spectroscopy and Related Phenomena 215 (2017) 8-15.
Mosset, A. et al., "Laboratory Dispersive Exafs Spectrometer," Acta Physica Polonica A, 91:4; 1997, 825-828.
Nachtrab, F. et al., "Simple solutions for spectroscopic, photon counting X-ray imaging detectors," 2009 IEEE Nuclear Science Symposium Conference Record, Oct. 24-Nov. 1, 2009, 1636-1639.
Nagel, S. R. et al., "Dilation x-ray imager a new/faster gated x-ray imager for the NIF," Rev. Sci. Instrum. 83, 10E116 (2012).
Nedoseykina, T. et al., "In situ X-ray absorption spectroscopic study for the electrochemical delithiation of a cathode LiFe0.4Mn0.6PO4 material," Electrochimica Acta 55 (2010) 8876-8882.
Nishihagi, K. et al., "Recent Improvements in Laboratory XAFS Facility," Jpn. J. Appl. Phys. vol. 32 (1993) Suppl. 32-2, pp. 258-260.
Nonaka, T. et al., "In situ XAFS and micro-XAFS studies on LiNi0.8Co0.15Al0.05O2 cathode material for lithium-ion batteries," Journal of Power Sources 162 (2006) 1329-1335.
Ohyama, J. et al., "In Situ Observation of Nucleation and Growth Process of Gold Nanoparticles by Quick XAFS Spectroscopy," ChemPhysChem 2011, 12, 127-131.
Ordavo, I. et al., "A new pnCCD-based color X-ray camera for fast spatial and energy-resolved measurements," Nuclear Instruments and Methods in Physics Research A 654 (2011) 250-257.
Ouvrard, G. et al., "Characterization of lithium battery materials during their functioning in using dispersive XAS," Physica Scripta. vol. T115, 346-348, 2005.
Pacold, J. I. et al., "A miniature X-ray emission spectrometer (miniXES) for high-pressure studies in a diamond anvil cell," J. Synchrotron Rad. (2012). 19, 245-251.
Parratt, L. G. et al., "'Thickness Effect' in Absorption Spectra near Absorption Edges," Physical Review 105:4, Feb. 15, 1957, 1228-1232.
Patlolla, A. et al., "Application of Operando XAS, XRD, and Raman Spectroscopy for Phase Speciation in Water Gas Shift Reaction Catalysts," ACS Catal. 2012, 2, 2216-2223.
Patlolla, A. et al., "Characterization of Metal-Oxide Catalysts in Operando Conditions by Combining X-ray Absorption and Raman Spectroscopies in the Same Experiment," Top Catal 56:896-904.
Peng-Fei, Y. et al., "Variation of Ti Valence with Lithium Content in Lithiated/Delithiated Li4Ti5O12 Studied by X-Ray Absorption near the Edge Structure," Chin. Phys. Lett. vol. 30, No. 3 (2013) 036102.
Petric, M. et al., "Chemical State Analysis of Phosphorus Performed by X-ray Emission Spectroscopy," Anal. Chem. 2015, 87, 5632-5639.
Plateau, G. R. et al., "Low-Emittance Electron Bunches from a Laser-Plasma Accelerator Measured using Single-Shot X-Ray Spectroscopy," PRL 109, 064802 (2012).
Pollock, C. J. et al., "Valence-to-Core X-ray Emission Spectroscopy: A Sensitive Probe of the Nature of a Bound Ligand," J. Am. Chem. Soc. 2011, 133, 5594-5601.
Prestipino, C. et al., "Quick-EXAFS implementation on the general purpose EXAFS beamline at ESRF," J. Synchrotron Rad. (2011). 18, 176-182.
Pushkar, Y. et al., "Direct Detection of Oxygen Ligation to the Mn4Ca Cluster of Photosystem II by X-ray Emission Spectroscopy," Angew. Chem. Int. Ed. 2010, 49, 800-803.

(56) References Cited

OTHER PUBLICATIONS

Ramaker, D. E. et al., "The atomic AXAFS and DI XANES techniques as applied to heterogeneous catalysis and alectrocatalysis," Phys. Chem. Chem. Phys., 2010, 12, 5514-5534.

Said, A. et al., "New developments in fabrication of high-energy-resolution analyzers for inelastic X-ray spectroscopy," J. Synchrotron Rad. (2011) 18, 492-496.

Sakurai, K. et al., "Recent performance of laboratory-scale X-ray absorption fine structure instruments," Spectrochimica Acta Part B 54 (1999) 99-107.

Sayers, D. E. et al., "New Technique for Investigating Noncrystalline Structures: Fourier Analysis of the Extended X-Ray-Absorption Fine Structure," Physical Review Letters, 27:18, Nov. 1, 1971, 1204-1207.

Schwoerer-Bohning, M. et al., "High resolution inelastic x-ray scattering spectrometer at the advanced photon source," Review of Scientific Instruments 69, 3109 (1998).

Seidler, G. T. et al., "A laboratory-based hard x-ray monochromator for high-resolution x-ray emission spectroscopy and x-ray absorption near edge structure measurements," Rev. Sci. Instrum. 85, 113906 (2014).

Seidler, G. T. et al., "A Modern Laboratory XAFS Cookbook," (XAFS16), Journal of Physics: Conference Series 712 (2016).

Seidler, G. T., "Final Scientific Report: DE-SC0008580," Technical Report, 2017.

Servoli, L. et al., "Characterization of standard CMOS pixel imagers as ionizing radiation detectors," 2010 JINST 5 P07003.

Shevelko, A. P. et al., "Compact focusing von Hamos spectrometer for quantitative x-ray spectroscopy," Review of Scientific Instruments, Rev. Sci. Instrum. 73 (10), 3458-3463 (2002).

Shigemura, H. et al., "Structure and Electrochemical Properties of $LiFe_xMn_{2-x}O_4$ ($0 \leq x \leq 0.5$) Spinel as 5 V Electrode Material for Lithium Batteries," Journal of The Electrochemical Society, 148 (7) A730-A736 (2001).

Shikano, M. et al., "X-ray absorption near-edge structure study on positive electrodes of degraded lithium-ion battery," Journal of Power Sources 196 (2011) 6881-6883.

Shiraishi, Y. et al., "In situ Transmission X-Ray Absorption Fine Structure Analysis of the Charge-Discharge Process in $LiMn_2O_4$, a Rechargeable Lithium Battery Material," Journal of Solid State Chemistry 133, 587-590 (1997).

Shuvaev, A. T. et al., "Laboratory diffractometer-based XAFS spectrometer," J. Synchrotron Rad. (1999) 6, 158-160.

Shvyd'ko, Y. et al., "MERIX—Next generation medium energy resolution inelastic X-ray scattering instrument at the APS," Journal of Electron Spectroscopy and Related Phenomena 188 (2013) 140-149.

Simonin, L. et al., "In situ investigations of a Li-rich Mn—Ni layered oxide for Li-ion batteries," J. Mater. Chem., 2012, 22, 11316.

Sinn, H. et al., "An inelastic X-ray spectrometer with 2.2 meV energy resolution," Nuclear Instruments and Methods in Physics Research A 467-468 (2001) 1545-1548.

Sokaras, D. et al., "A high resolution and large solid angle x-ray Raman spectroscopy end-station at the Stanford Synchrotron Radiation Lightsource," Rev. Sci. Instrum. 83, 043112 (2012).

Sokaras, D. et al., "A seven-crystal Johann-type hard x-ray spectrometer at the Stanford Synchrotron Radiation Lightsource," Rev. Sci. Instrum. 84, 053102 (2013).

Stampanoni, M. et al., "High resolution X-ray detector for synchrotron-based microtomography," Nuclear Instruments and Methods in Physics Research A 491 (2002) 291-301.

Stefanescu, A. et al., "The Wide Field Imager of the International X-ray Observatory," Nuclear Instruments and Methods in Physics Research A624 (2010) 533-539.

The International Search Report (ISR) with Written Opinion for PCT/US2017/051789 dated Nov. 21, 2017, pp. 1-6.

US 11,054,375 B2

X-RAY SPECTROMETER AND METHODS FOR USE

CROSS-REFERENCE TO RELATED APPLICATION

This application is a U.S. national phase of International Application No. PCT/US2017/051789, filed on Sep. 15, 2017, which claims priority to U.S. Provisional Application No. 62/394,981, filed Sep. 15, 2016, both of which are incorporated by reference herein in their entirety.

STATEMENT REGARDING FEDERALLY SPONSORED RESEARCH OR DEVELOPMENT

This invention was made with government support under Contract Numbers DE-AC52-06NA25396, DE-SC0008580, and DE-FG02-09ER16106, awarded by the United States Department of Energy. The government has certain rights in the invention.

BACKGROUND

Unless otherwise indicated herein, the materials described in this section are not prior art to the claims in this application and are not admitted to be prior art by inclusion in this section.

X-ray spectrometers can be implemented with a number of different geometries and components based on the nature and quality of the data desired and available financial resources. One way to collect x-ray emission spectroscopy (XES) data from a sample is to use a collimated or focused x-ray source capable of illuminating the sample with a very small (e.g., less than 0.01 millimeters) spot size of x-rays. The sample and a point detector can be moved along opposite sides of a Rowland circle defined by a crystal analyzer to "tune" the spectrometer to detect x-rays of various wavelengths that are emitted (or transmitted) from the spot on the sample. However, such collimated or focused sources generally either take the form of very large, expensive, and rare (e.g., hard to access) synchrotron sources, or they include expensive focusing optics which can reduce the intensity of the x-ray beam incident on the sample which can increase the amount of time it takes to collect data. This geometry also typically requires that the movement of the sample and the detector are controlled with high precision.

Another option involves using a focused x-ray source and a position-sensitive detector (e.g., a stripline detector or an area detector). This approach eliminates the need for precise position control of the detector during data collection, but the disadvantages of the focused source of x-rays remains.

Yet another approach involves using a lower-cost x-ray source (e.g., an x-ray tube) that emits unfocused x-rays, resulting in a larger spot size on the sample. Typically, both the sample and the detector must be tangent to the Rowland circle defined by the crystal analyzer, which limits how small the spectrometer can be. Using a bulky spectrometer might not be practical in certain environments in the field.

SUMMARY

In one example, a spectrometer includes a crystal analyzer having a radius of curvature that defines a Rowland circle, a sample stage configured to support a sample such that the sample is offset from the Rowland circle, an x-ray source configured to emit unfocused x-rays toward the sample stage, and a position-sensitive detector that is tangent to the Rowland circle.

In another example, a method is performed via a spectrometer having a crystal analyzer with a radius of curvature that defines a Rowland circle. The method includes emitting, via an x-ray source, unfocused x-rays toward a sample that is mounted on a sample stage such that the sample is offset from the Rowland Circle, thereby causing the sample to emit x-rays that impinge on the crystal analyzer or transmit a portion of the unfocused x-rays to impinge on the crystal analyzer. The method further includes scattering, via the crystal analyzer, the x-rays that impinge on the crystal analyzer and detecting the scattered x-rays via a position-sensitive detector that is tangent to the Rowland circle.

When the term "substantially" or "about" is used herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. In some examples disclosed herein, "substantially" or "about" means within +/−5% of the recited value.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

DETAILED DESCRIPTION

As discussed above, current x-ray spectrometer implementations have disadvantages such as requiring precise sample and/or detector motion control to scan a range of x-ray wavelengths, the use of expensive and/or hard to access point x-ray sources, or a lack of portability due to instrument bulkiness. Approaches for alleviating these issues are discussed herein.

A dispersive refocusing Rowland (DRR) spectrometer includes a crystal analyzer having a radius of curvature that defines a Rowland circle and a sample stage configured to support a sample such that the sample is offset from the Rowland circle. The spectrometer further includes an x-ray source configured to emit unfocused x-rays toward the sample stage and a position-sensitive detector that is tangent to the Rowland circle. In an emission mode, the x-ray source is configured to emit the unfocused x-rays toward the sample stage such that, when the sample is present, the unfocused x-rays are incident upon a surface of the sample that faces the crystal analyzer. In a transmission mode, the x-ray source is configured to emit the unfocused x-rays toward the sample stage such that, when the sample is present, the unfocused x-rays are incident upon a surface of the sample that faces away from the crystal analyzer.

The DRR geometry has several advantages. First, an inexpensive, unfocused x-ray source such as an x-ray tube can be used instead of an expensive and less convenient synchrotron source or an x-ray source that is coupled with focusing optics. Using a larger, unfocused x-ray spot upon the sample makes it more likely that a volume of the sample that is representative of the sample as a whole will be examined, and also that the sample will receive a higher x-ray flux, reducing the amount of time required for data collection. The DRR geometry also allows the x-ray source and the sample stage to be positioned well inside of the Rowland circle which allows some miniaturization of the spectrometer to occur. Through the use of the position-sensitive detector that is tangent to the Rowland circle, the DRR geometry may allow a relatively large range of x-ray wavelengths to be examined without moving the detector, the sample, or the x-ray source. Data collected by a DRR spectrometer is only weakly sensitive to spot size, sample size, and small sample displacements.

Figure 1:
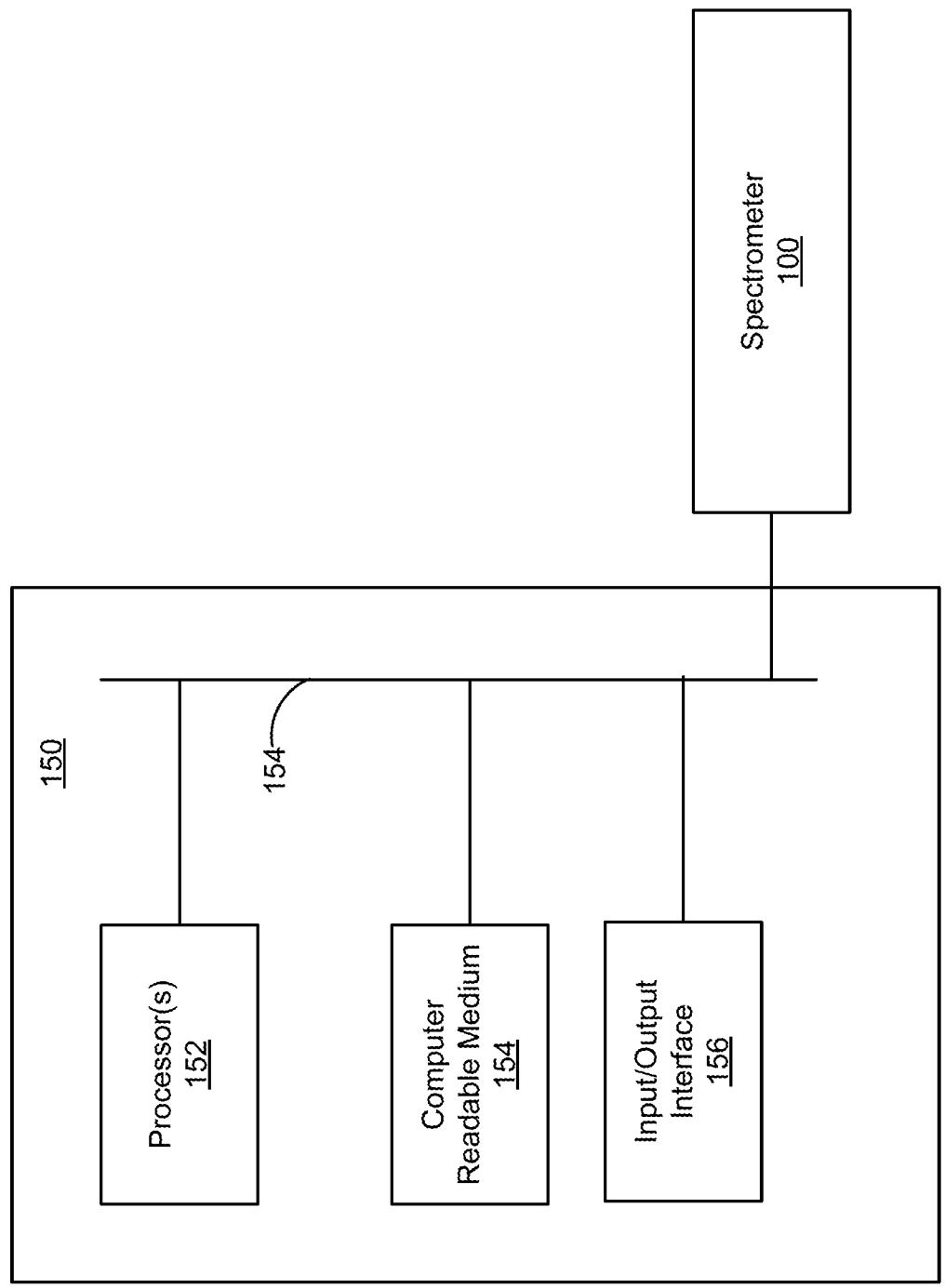
FIG. 1 is a schematic diagram of a computing system and a spectrometer, according to an example embodiment.

FIG. 1 is a schematic diagram of an example computing system 150 configured to control a spectrometer 100. The computing system 150 includes processor(s) 152, a computer readable medium 154, and an input/output interface 156, any or all of which may be communicatively coupled to each other and/or the spectrometer 100 via a system bus or another connection mechanism 154.

The processor 152 may include a general purpose processor and/or a special purpose processor and may be configured to execute program instructions stored within the computer readable medium 154. In some examples, the processor 152 may be a multi-core processor comprised of one or more processing units configured to coordinate to execute instructions stored within computer readable medium 154. In one example, the processor 152, by executing program instructions stored within computer readable medium 154, may control, operate, or move components of the spectrometer 100.

The computer readable medium 154 may include one or more volatile, non-volatile, removable, and/or non-removable storage components. The computer readable medium 154 may be a magnetic, optical, or flash storage medium, and may be integrated in whole or in part with the processor 152 or other portions of the computing system 150. Further, the computer readable medium 154 may be a non-transitory computer-readable storage medium, having stored thereon program instructions that, when executed by the processor 152, cause the computing system 150 to perform or cause the spectrometer 100 to perform any functions described in this disclosure. Such program instructions may be part of a software application that can be executed in response to inputs received from the input/output interface 156, for instance. The computer readable medium 154 may also store other types of information or data, such as those types described throughout this disclosure.

The input/output interface 156 may enable interaction with a user of the computing system 150, if applicable. The input/output interface 156 may include input components such as dials, buttons, a keyboard, a mouse, a keypad, or a touch-sensitive panel, and output components such as a display screen (which, for example, may be combined with a touch-sensitive panel), a sound speaker, and a haptic feedback system.

Figure 2:
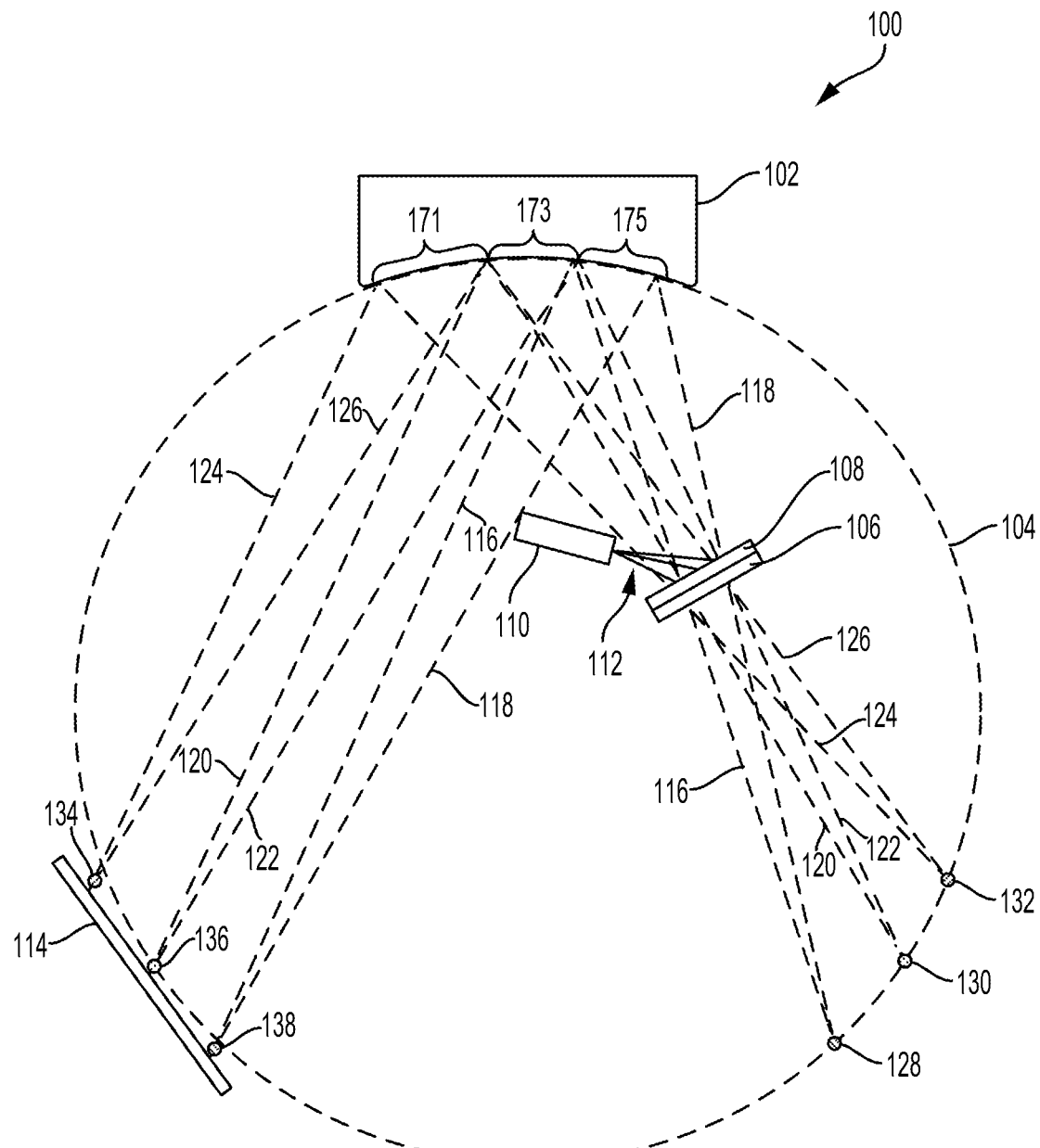
FIG. 2 is a schematic diagram of a spectrometer, according to an example embodiment.

FIG. 2 is a schematic diagram of the spectrometer 100. The spectrometer 100 includes a crystal analyzer 102 having a radius of curvature that defines a Rowland circle 104 and a sample stage 106 configured to support a sample 108 such that the sample 108 is offset from (e.g., within) the Rowland circle 104. The spectrometer 100 further includes an x-ray source 110 configured to emit unfocused x-rays 112 toward the sample stage 106 (e.g., toward the sample 108) and a position-sensitive detector 114 that is tangent to the Rowland circle 104. The spectrometer 100 may be operable to distinguish between x-rays having an energy difference as small as 1 electron-volt (eV) or smaller.

The crystal analyzer 102 is composed of a crystalline material such as silicon or germanium, for example. The crystal analyzer 102 is configured to receive x-rays that are emitted from or transmitted through the sample 108 and may operate by selectively scattering, via Bragg reflection, x-rays within a particular wavelength/energy band based on the lattice spacing of the crystal analyzer 102 and the orientation of the crystal analyzer 102 with respect to the sample 108. The crystal analyzer 102 may have one or more of the following curvatures: spherical, toroidal, more complex double-curvature, or cylindrical each in, for example, a Johann variant, or a Johansson variant. The crystal analyzer 102 may have at least one axis of rotational symmetry and a radius or radii of curvature that are no more than 30 centimeters (cm), no more than 20 cm, or no more than 10 cm. Other examples are possible.

As shown in FIG. 2, the crystal analyzer 102 may have a radius of curvature that defines the Rowland circle 104. The dimensions (e.g., radius of curvature) of the crystal analyzer 102 might not be depicted to scale in FIG. 2 with respect to the Rowland circle 104. The radius of curvature of the crystal analyzer 102 may be equal to the diameter of the Rowland circle 104 (i.e., twice the radius of the Rowland circle 104), but other examples are possible.

The sample stage 106 may include any structure or platform configured to hold or support the sample 108 such that the sample 108 is offset from (e.g., inside or outside) the Rowland circle 104. In some examples, unobstructed optical paths may exist between the entirety of the sample stage 106 (when uncovered by the sample 108) and a face of the crystal analyzer 102 having a radius of curvature. The sample stage 106 may have a hole that allows for x-rays to transmit through the sample 108 in some configurations (e.g., transmission). In some transmission configurations, the sample 108 and the sample stage 106 is located between the crystal analyzer 102 and the position-sensitive detector 114, and the x-ray source 110 is aligned toward the crystal analyzer 102 such that the unfocused x-rays 112 are incident on the crystal analyzer 102 and scattered toward the sample 108 and the sample stage 106.

The sample 108 may generally include any liquid or solid material of interest. In the case of a liquid sample 108, the sample 108 may be enclosed within a transparent container and mounted on the sample stage 106. A solid sample 108 may be directly mounted on the sample stage 106.

The x-ray source 110 may take the form of an x-ray tube, but other examples are possible. The x-ray source 110 may be configured to emit unfocused x-rays 112 towards the sample 108. The unfocused x-rays 112 may include unfocused and/or broadband x-rays, but other examples are possible. The x-ray source 110 may be configured to emit x-rays having a spot size on the sample 108 that is at least 0.1 mm in width. The x-ray source 110 can be located inside or outside of the Rowland circle 104 based on the configuration of the spectrometer 100.

In the emission configuration shown in FIG. 2, the x-ray source 110 is configured to emit the unfocused x-rays 112 toward the sample stage 106 such that, when the sample 108 is present, the unfocused x-rays 112 are incident upon a surface of the sample 108 that faces the crystal analyzer 102.

In a transmission configuration, the x-ray source is configured to emit the unfocused x-rays toward the sample stage 106 such that, when the sample 108 is present, the unfocused x-rays are incident upon a surface of the sample 108 that faces away from the crystal analyzer 102. In the transmission configuration, the sample stage 106 is positioned between an x-ray source and the crystal analyzer 102.

The position-sensitive detector 114 may take the form of any camera, area detector, or line detector configured to detect counts, intensity, and/or energy/wavelength of x-rays that are scattered by the crystal analyzer 102. The position-sensitive detector 114 may also include a mechanism (e.g., one or more motorized or non-motorized micrometers) configured to move the position-sensitive detector 114 relative to the crystal analyzer 102. In various examples, the position-sensitive detector includes a charge-coupled device, a CMOS camera, a stripline detector, a diode array, a phosphorus screen, a spectroscopic camera, or a position-sensitive proportional counter.

The crystal analyzer 102 may be configured to scatter an x-ray 116 and an x-ray 118 both having a first wavelength coming from different directions (with respect to the sample 108) to a first position 138 on the position-sensitive detector 114. Additionally, the crystal analyzer 102 may be configured to scatter an x-ray 120 and an x-ray 122 having a second wavelength coming from different directions to a second position 136 on the position-sensitive detector 114. Also, the crystal analyzer 102 may be configured to scatter an x-ray 124 and an x-ray 126 having a third wavelength coming from different directions to a third position 134 on the position-sensitive detector 114. The x-ray 116 and the x-ray 118 can be envisioned as originating from a common "virtual" source location 128. The x-ray 120 and the x-ray 122 can be envisioned as originating from a common "virtual" source location 130. The x-ray 124 and the x-ray 126 can be envisioned as originating from a common "virtual" source location 132.

The crystal analyzer 102 and the position-sensitive detector 114 may be configured to rotate in unison with respect to the sample stage 106 to enable analysis of different wavelengths of x-rays.

The x-rays 116-126 may include x-rays that are selectively scattered by the crystal analyzer 102 via Bragg scattering. That is, the x-rays 116-126 may be limited to respective energy ranges that satisfy the Bragg condition of the crystal analyzer 102 based on their angles of incidence upon the crystal analyzer 102.

The spectrometer 100 may be configured such that, for any wavelength of x-ray that originates from the sample stage 106 (e.g., the sample 108), there exists an exclusive region of the crystal analyzer 102 that corresponds to that wavelength at which the x-ray could both satisfy a Bragg condition of the crystal analyzer 102 and be redirected by the crystal analyzer 102 to the position-sensitive detector 114. For example, the x-ray 116 and the x-ray 118 both having a first wavelength (or wavelength range) might only reach the position-sensitive detector 114 if the x-ray 116 and the x-ray 118 are incident on the crystal analyzer 102 within the region 175. The x-ray 120 and the x-ray 122 both having a second wavelength (or wavelength range) might only reach the position-sensitive detector 114 if the x-ray 120 and the x-ray 122 are incident on the crystal analyzer 102 within the region 173. The x-ray 124 and the x-ray 126 both having a third wavelength (or wavelength range) might only reach the position-sensitive detector 114 if the x-ray 124 and the x-ray 126 are incident on the crystal analyzer 102 within the region 171. Other examples are possible.

Figure 3:
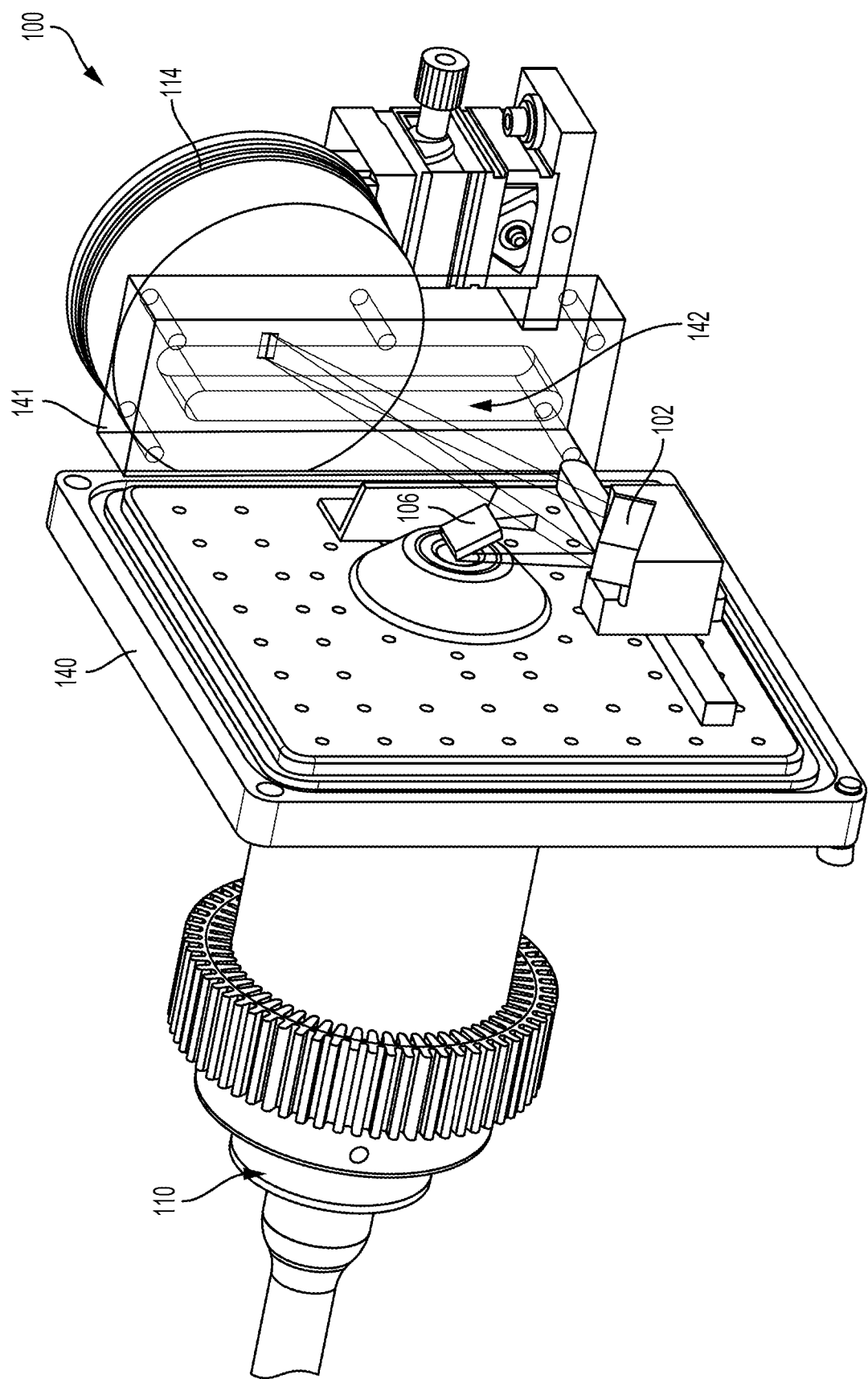
FIG. 3 is a perspective view of some components of a spectrometer, according to an example embodiment.

FIG. 3 is a perspective view of some components of the spectrometer 100. The spectrometer 100 may include a vacuum chamber. One wall 140 of the vacuum chamber is shown in FIG. 3. The sample stage 106 (e.g., the sample 108), the crystal analyzer 102, and at least a portion of the x-ray source 110 may be positioned within the vacuum chamber. As shown in FIG. 3, the x-ray source 110 may penetrate the wall 140 of the vacuum chamber. The spectrometer 100 may further include an exit window (e.g., a kapton window) 142 within a wall 141 of the vacuum chamber. The exit window 142 may be substantially transparent to x-rays and be between the crystal analyzer 102 and the position-sensitive detector 114. In other examples, the position-sensitive detector is inside the vacuum chamber.

Figure 4:
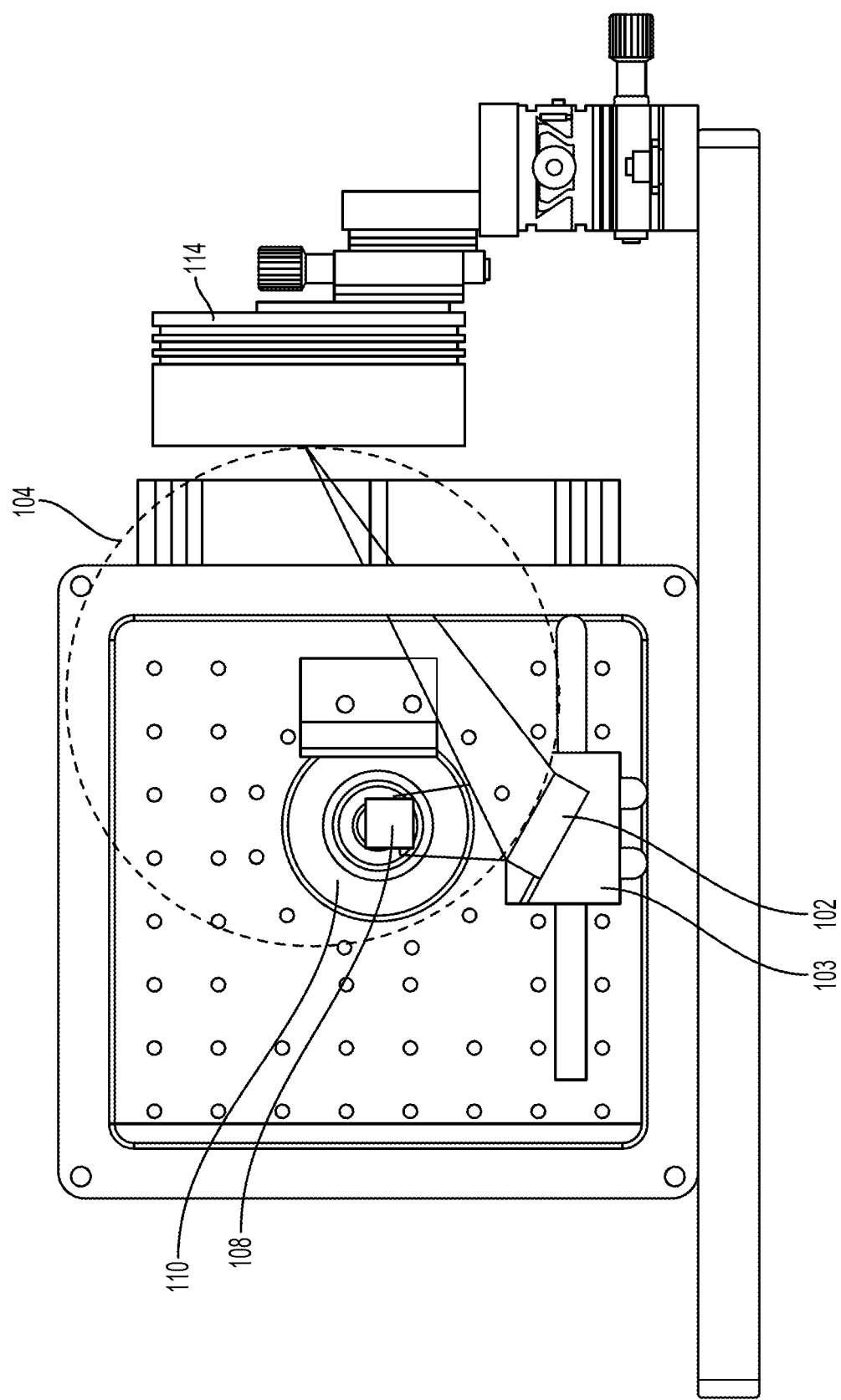
FIG. 4 is a front view of some components of a spectrometer, according to an example embodiment.

FIG. 4 is a front view of some components of the spectrometer 100. The crystal analyzer 102 may be mounted on a stage or mounting bracket 103. Adjusting the mounting bracket 103 may cause the analyzer 102 and the Rowland circle 104 to move and can be used to examine different wavelengths of x-rays. Generally, the position-sensitive detector 114 is moved or rotated into a position that is tangent to the moved Rowland circle 104.

Figure 5:
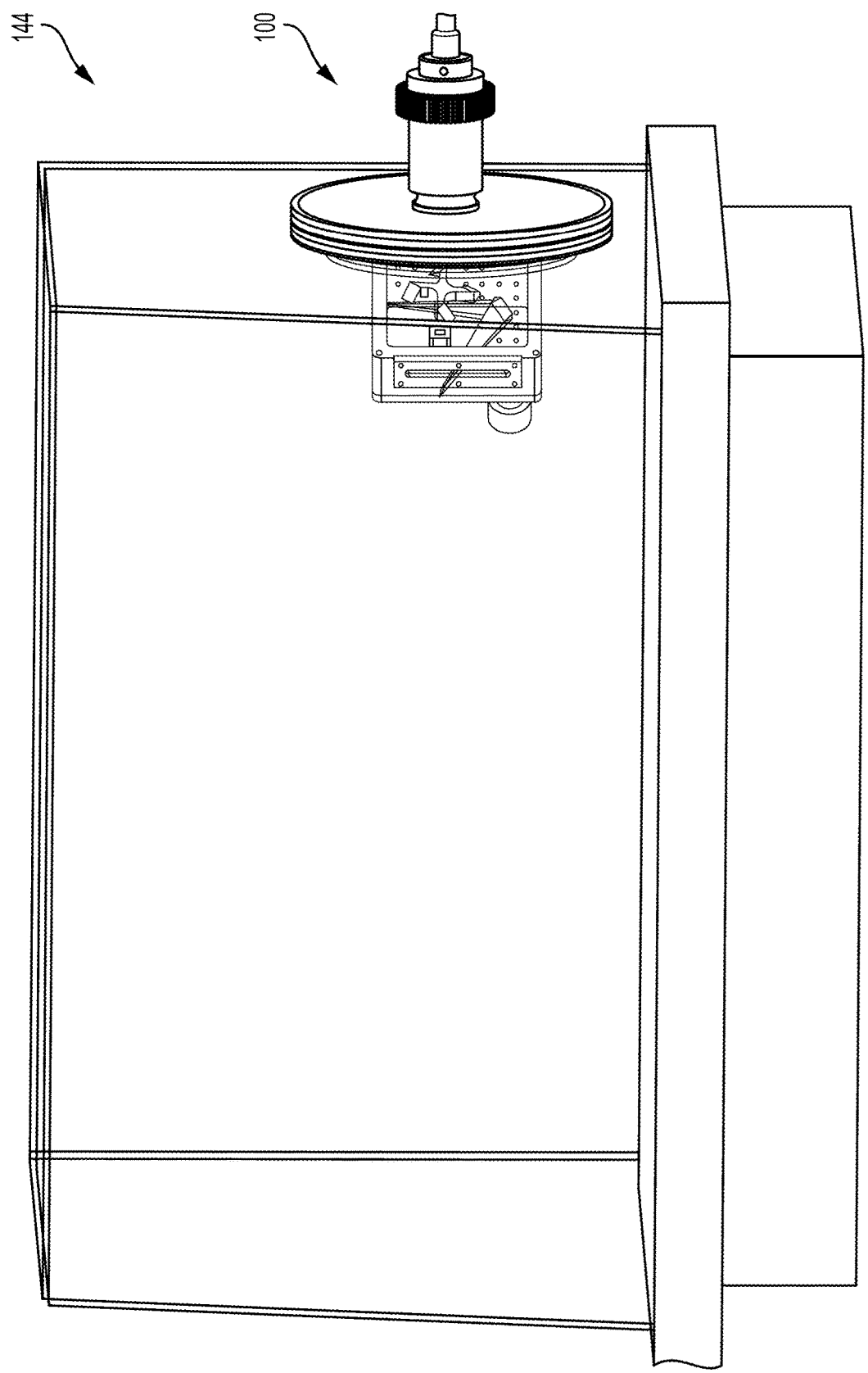
FIG. 5 shows a spectrometer that is integrated into a glove box or fume hood, according to an example embodiment.

FIG. 5 shows the spectrometer 100 integrated into a glove box 144 (e.g., fume hood). This configuration may be useful to examine materials that are reactive in air or are potentially hazardous.

Figure 6:
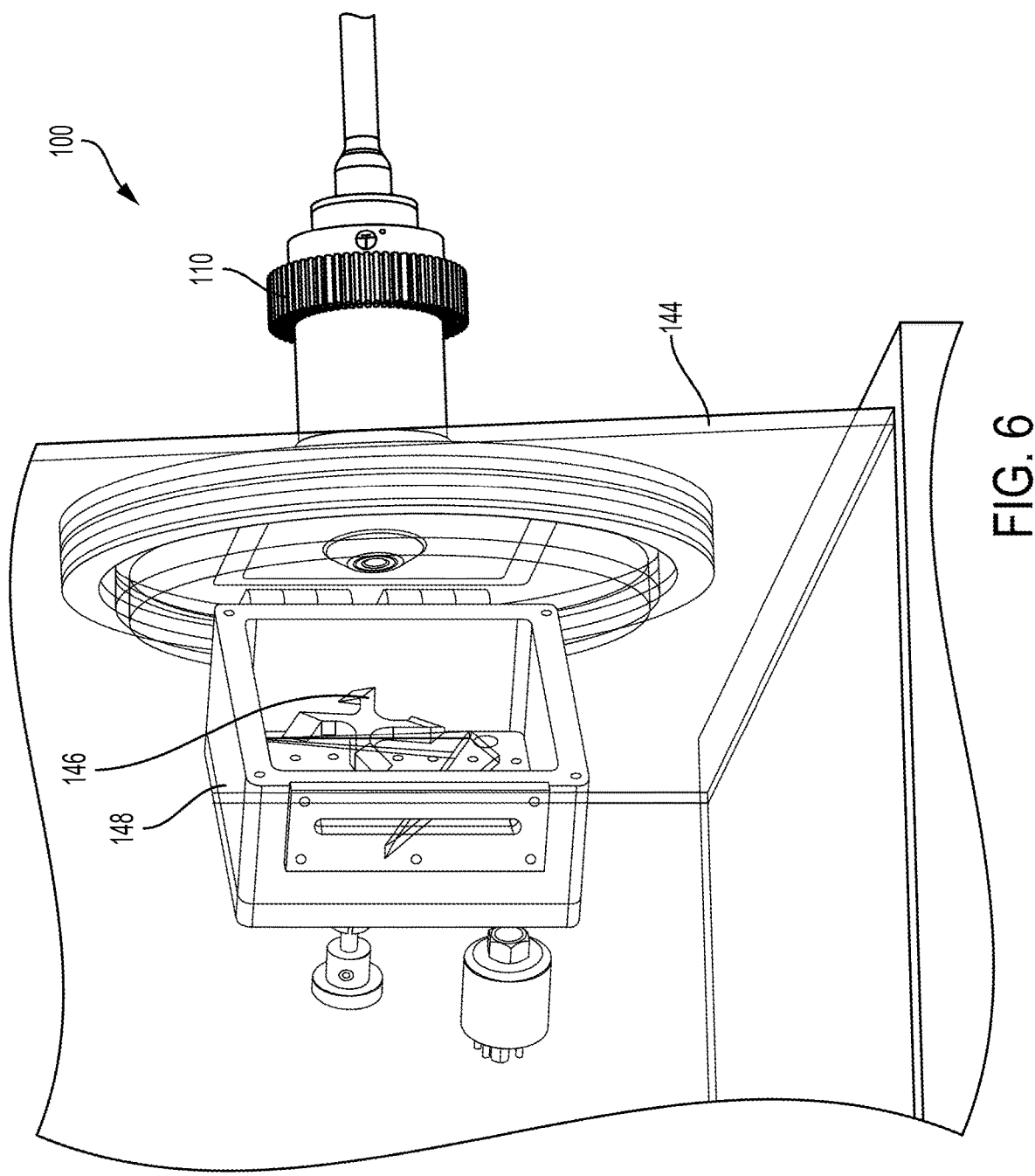
FIG. 6 is a close up view of a spectrometer that is integrated into a glove box or fume hood, according to an example embodiment.

FIG. 6 is a close up view of the spectrometer 100 integrated into the glove box 144. The sample stage 106 or the spectrometer 100 generally may include a sample turret 146 configured to position a selected sample of two or more samples mounted on the sample turret 146 to be aligned with the x-ray source 110. FIG. 6 also shows the entirety of the vacuum chamber 148.

Figure 7:
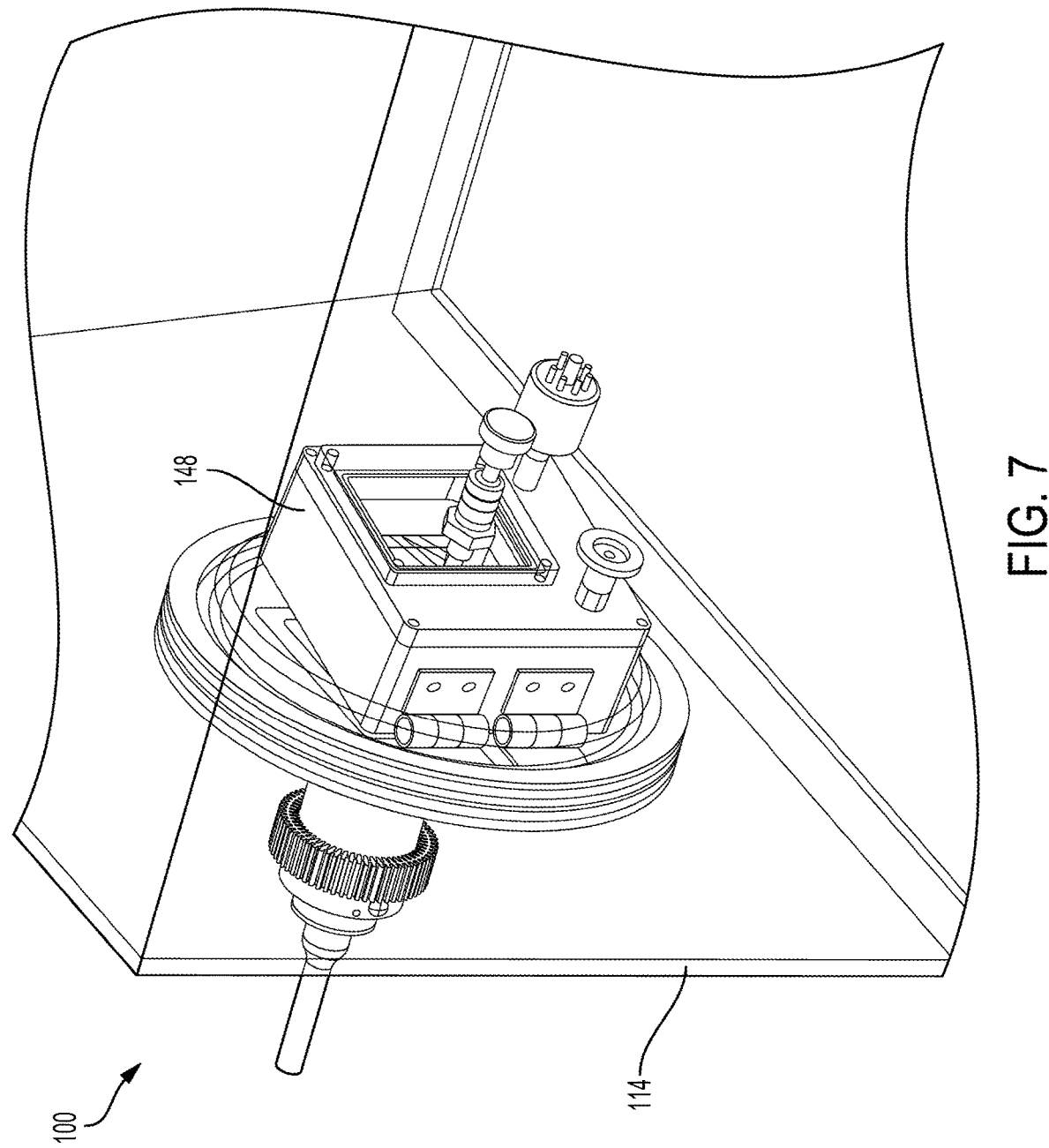
FIG. 7 is another close up view of a spectrometer that is integrated into a glove box or fume hood, according to an example embodiment.

FIG. 7 is another close up view of the spectrometer 100 integrated into the glove box 144.

Figure 8:
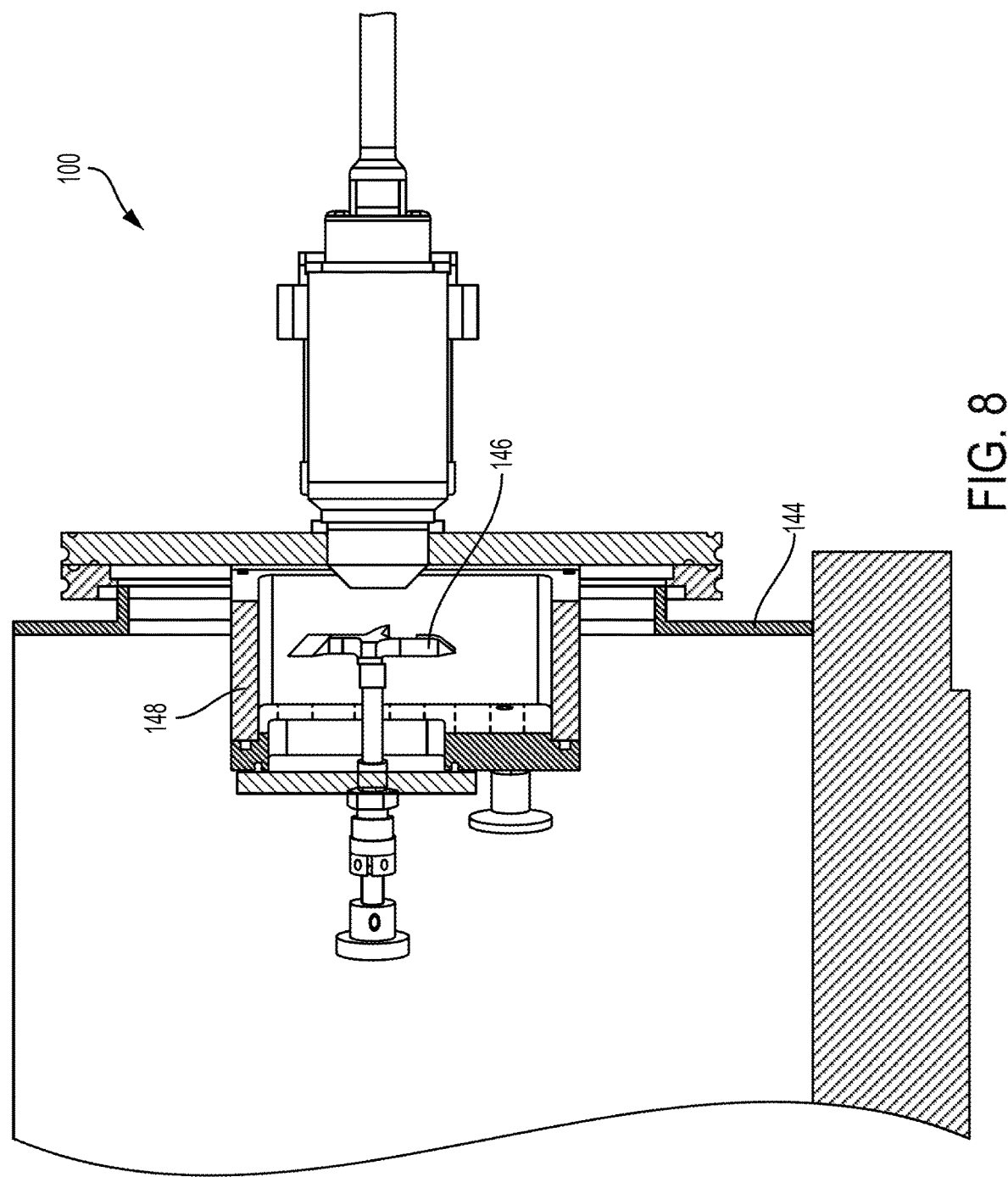
FIG. 8 is yet another close up view of a spectrometer that is integrated into a glove box or fume hood, according to an example embodiment.

FIG. 8 is yet another close up view of the spectrometer 100 integrated into the glove box 144.

Figure 9:
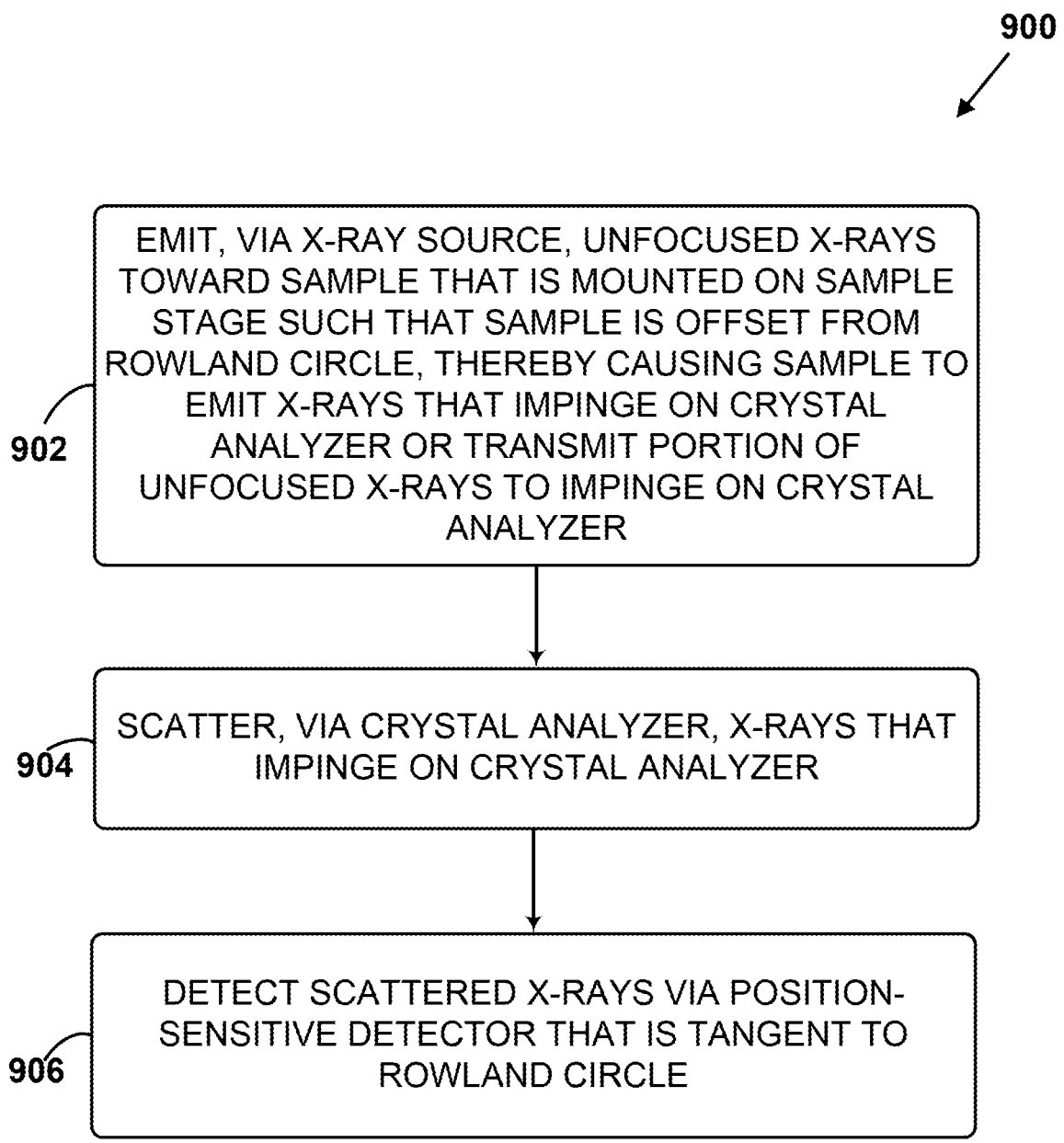
FIG. 9 is block diagram of a method, according to an example embodiment.

FIG. 9 is a block diagram of a method 900 performed via a spectrometer having a crystal analyzer with a radius of curvature that defines a Rowland circle. For example, the method 900 may be performed using the spectrometer 100.

At block 902, the method 900 includes emitting, via an x-ray source, unfocused x-rays toward a sample that is mounted on a sample stage such that the sample is offset from the Rowland Circle, thereby causing the sample to emit x-rays that impinge on the crystal analyzer or transmit a portion of the unfocused x-rays to impinge on the crystal analyzer.

For example, the x-ray source 110 may emit unfocused (e.g, broadband) x-rays 112 toward the sample 108 that is mounted on the sample stage 106 such that the sample 108 is offset from the Rowland circle 104. In various embodiments, the x-ray source may be located inside or outside of the Rowland circle. The unfocused x-rays 112 may form a spot on the sample 108 having a width of at least 0.1 mm. Other beam spot sizes are possible.

In the emission configuration shown in FIG. 2, the x-ray source 110 emits the unfocused x-rays 112 such that the unfocused x-rays 112 are incident upon a surface of the sample 108 that faces the crystal analyzer 102.

In a transmission configuration, the x-ray source may emit the unfocused x-rays such that the unfocused x-rays are incident upon a surface of the sample 108 that faces away from the crystal analyzer 102. In this context, the sample stage 106 may be positioned between the x-ray source 110 and the crystal analyzer 102.

At block 904, the method 900 includes scattering, via the crystal analyzer, the x-rays that impinge on the crystal analyzer. For example, the crystal analyzer 102 may scatter the x-rays 116-126 after the x-rays 116-126 impinge on the crystal analyzer 102.

At block 906, the method 900 includes detecting the scattered x-rays via a position-sensitive detector that is tangent to the Rowland circle. For example, the position-sensitive detector 114 may detect the x-rays 116-126 after the x-rays 116-126 are scattered by the crystal analyzer 102. In some examples such as that depicted in FIG. 3, the x-rays 116-126 may pass through the exit window 142 before being detected by the position-sensitive detector 114.

In examples where the spectrometer includes a vacuum chamber such as FIGS. 3-8, helium may be flowed into the vacuum chamber 148 and the emitting, the scattering, and the detecting may occur while the vacuum chamber 148 contains helium. Helium is a very weak absorber of x-rays and is chemically inert. When analyzing materials that are sensitive or reactive to air, filling the vacuum chamber 148 with helium may be easier than pumping the air out of the vacuum chamber 148.

Some embodiments may include rotating or moving the crystal analyzer 102 (e.g., by adjustment of the stage or mounting bracket 103) and rotating or moving the position-sensitive detector 114 respect to the sample stage 106 or the sample 108 to configure the spectrometer 100 to examine a particular band of x-ray wavelengths.

The aforementioned methods may be performed to determine a distribution of nominal oxidation states, identify provenance, and/or examine local chemistries of sulfur in oil shales, crude oil solids, crude oil liquids, refined crude oil products, processed or unprocessed oil shale, coal, coal ash, fly ash, biochars, soil, pigments, gem stones, or sulfur-containing materials that react with air.

The aforementioned methods may be performed to determine a distribution of nominal oxidation states, identify provenance, and/or examine local chemistries of phosphorus in biochars, lubricants, soil, phosphate-rich ores, or phosphorous-containing materials that react with air.

The aforementioned methods may be performed to determine a distribution of nominal oxidation states, identify provenance, and/or examine local chemistries of technetium in waste stream products from nuclear fuel processing or recovery, environmental samples showing technetium contamination, or technetium-containing materials that react with air.

The aforementioned methods may be performed to determine a distribution of nominal oxidation states, identify provenance, and/or examine local chemistries of chromium-containing consumer electronic components, soil, paint sludge, industrial waste, ore, or mine tailings.

Figure 10:
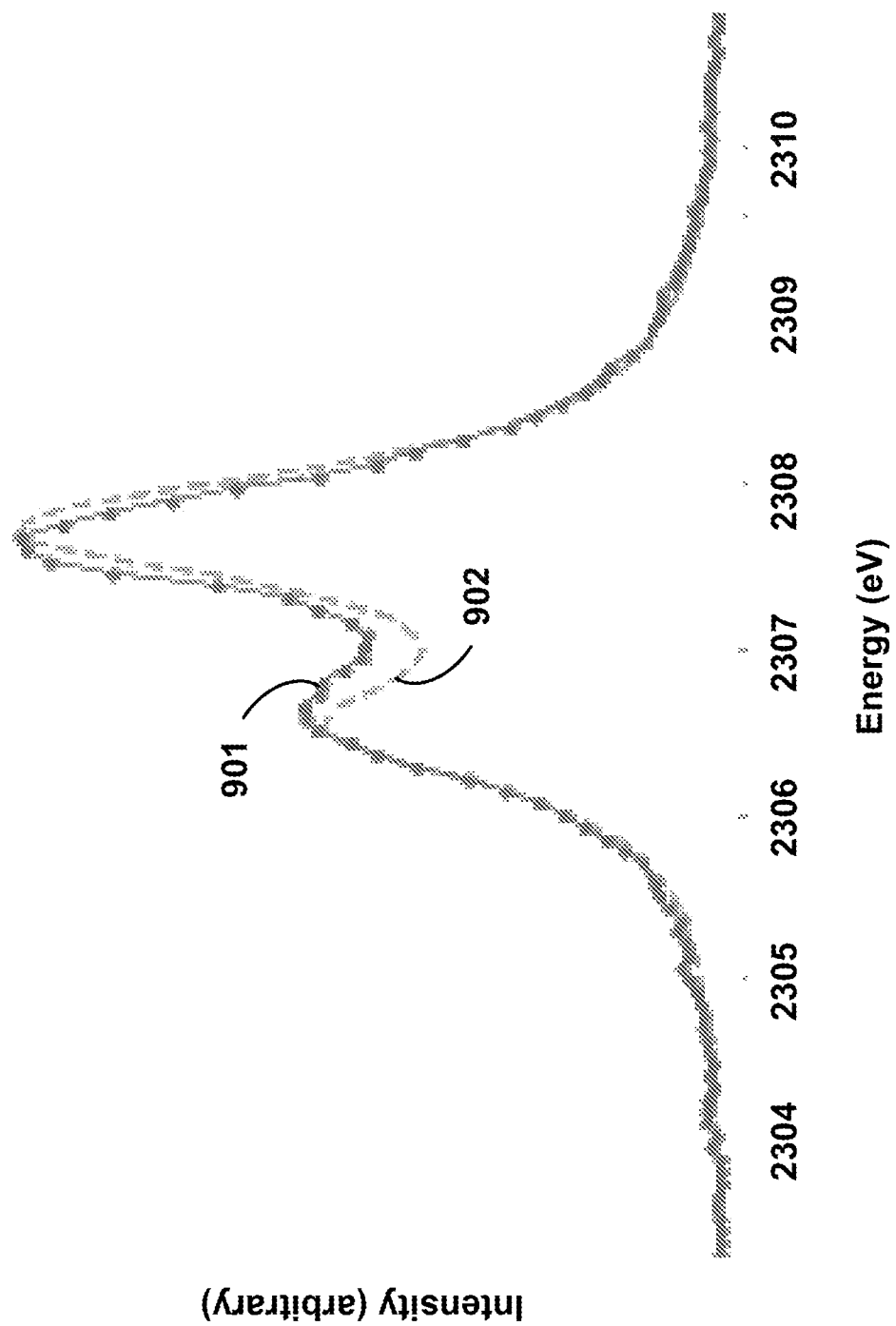
FIG. 10 depicts a comparison of data collected from ZnS with a DRR spectrometer and data collected from ZnS with another spectrometer, according to an example embodiment.

FIG. 10 depicts a comparison of S $K\alpha$ x-ray emission data collected from zinc sulfide (ZnS) with a DRR spectrometer and data collected from ZnS with another spectrometer. The data 901 was taken with a DRR spectrometer such as the spectrometer 100. The data 902 was taken at the European Synchrotron Radiation Facility on the undulator beamline 20-ID. There is a small loss of energy resolution in the data 901 when compared to the data 902, corresponding to a few tenths of an electron-volt (eV) broadening of the spectrum.

The energy-scale of the measurements was determined from geometric considerations based on a 10 cm Rowland circle, and the size of the camera. The spectrum was shifted to align with the data 902. To reduce Johann error, the analyzer was masked down to 2.5 mm, yielding a count rate of 7.5 photons/second, which was integrated over 15 hours to produce the data 901.

Figure 11:
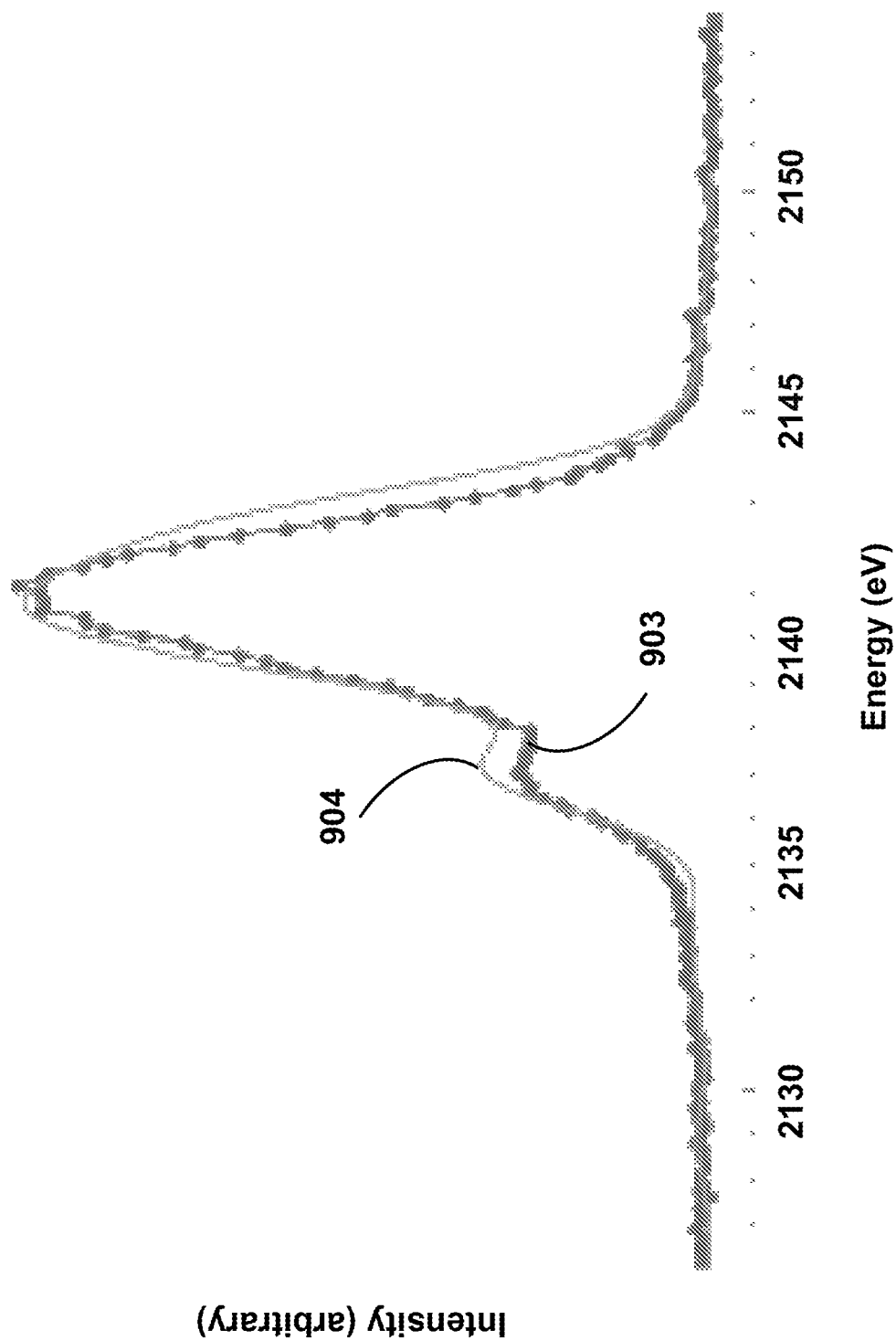
FIG. 11 depicts a comparison of data collected from GaP with a DRR spectrometer and theoretical expectations, according to an example embodiment.

FIG. 11 depicts a comparison of valence level $K\beta$ x-ray fluorescence data 903 collected from gallium phosphide (GaP) with a DRR spectrometer such as the spectrometer 100 and data 904 calculated based on theoretical expectations. Shown in FIG. 11 is a measurement of P $K\beta$ emission from a sample of GaP. In phosphorous, $K\beta$ emission is a valence-to-core transition, which allowed the data 903 obtained to be compared to a simulation done using FEFF software, and good agreement is obtained. The $K\beta$ emission is approximately 30 times weaker than the $K\alpha$ emission. The data 903 was integrated over 36 hours at a count rate of 2.6 photons/second.

Figure 12:
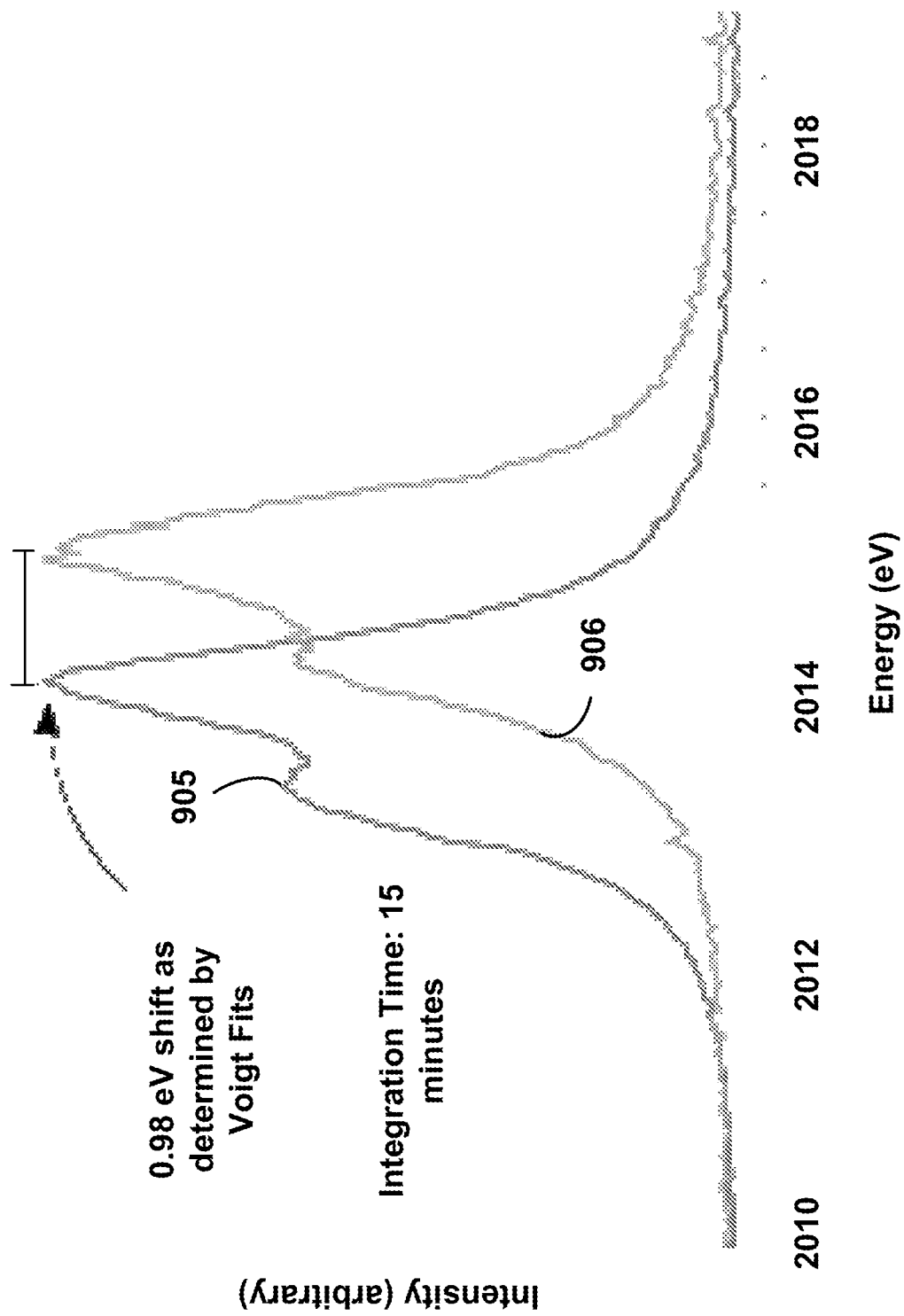
FIG. 12 depicts data illustrating an energy shift that is indicative of phosphorus having different oxidation states in GaP and $FePO_4$, according to an example embodiment.
Figure 13:
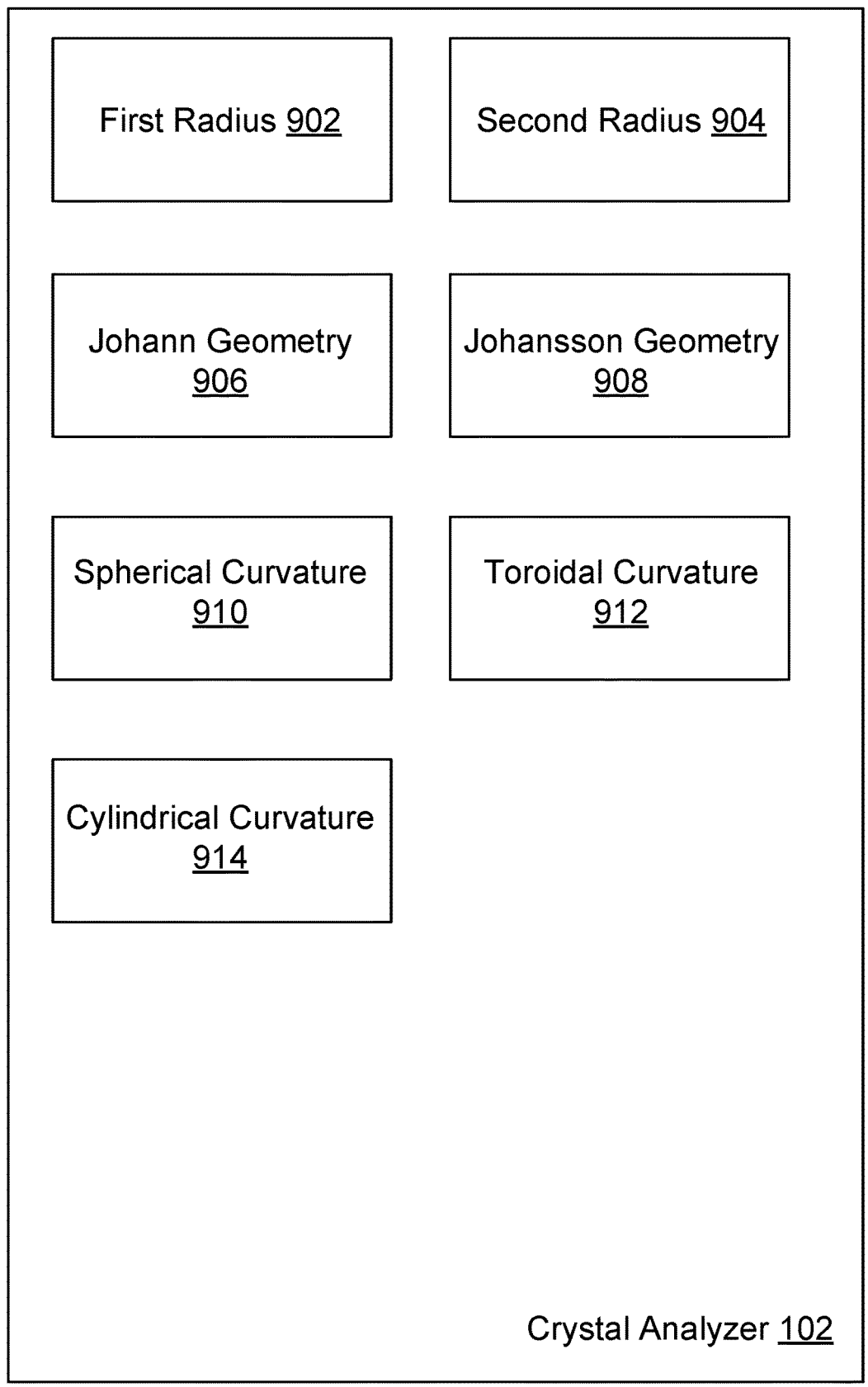
Figure 14:
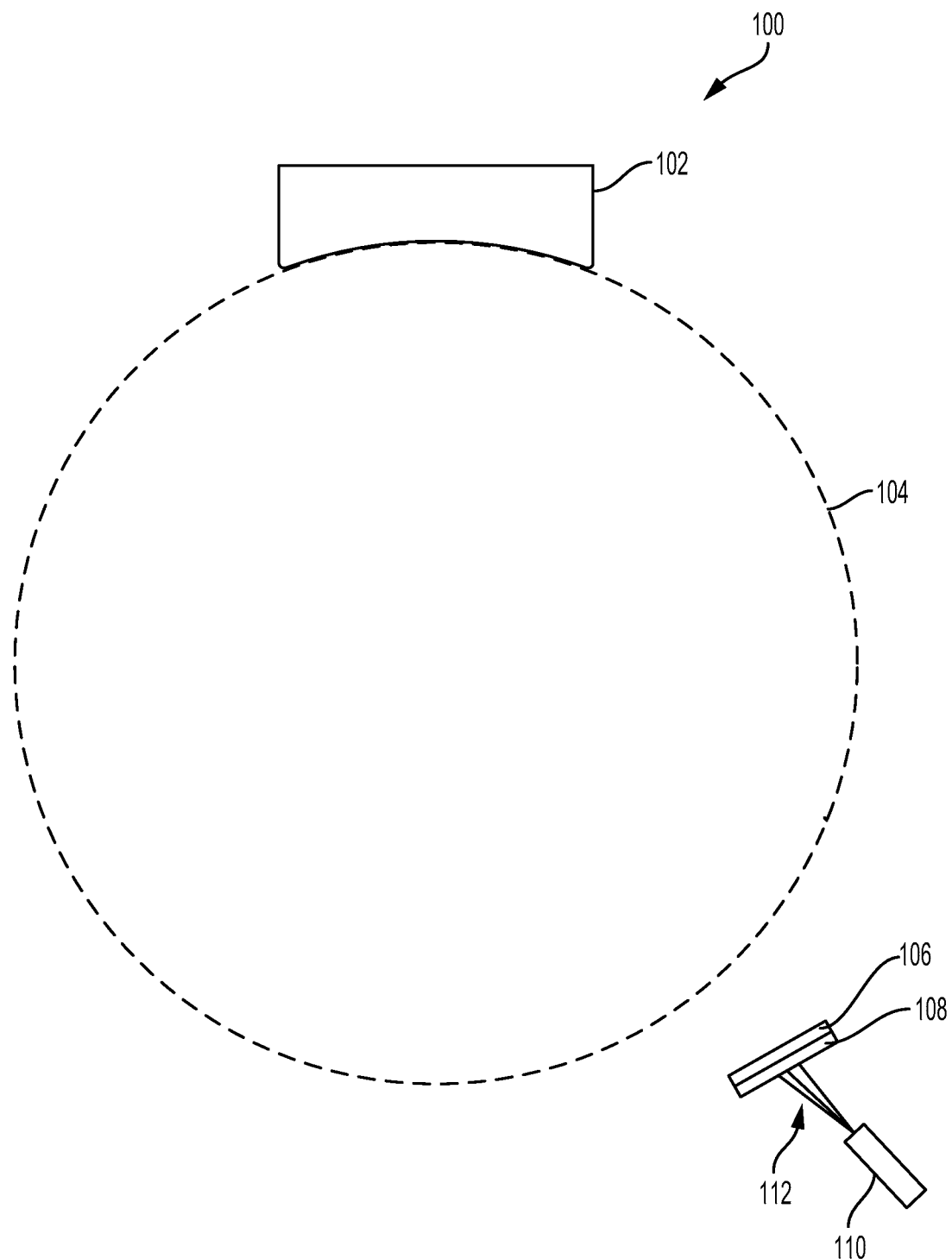

FIG. 12 depicts data illustrating an energy shift in P $K\alpha$ x-ray fluorescence that is indicative of phosphorus having different oxidation states in GaP and $FePO_4$. The two samples were mounted on a sample carousel (e.g., a sample turret) allowing a consistent energy scale across both measurements. The data 905 represents GaP and the data 906 represents $FePO_4$. The data 905 and the data 906 were collected with a spectrometer similar to the spectrometer 100.

The spectrometer 100 equipped with a sample turret enables such data corresponding to two different samples to be collected in a matter of minutes on the same energy scale, allowing energy shifts to be accurately quantified. This can be used, e.g., for determination of classical oxidation state. The illuminated spot on the sample may be larger than 3 mm×3 mm. In some embodiments, the area of the illuminated spot is at least 0.1 mm×0.1 mm in size, or at least 1 mm×1 mm in size.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A spectrometer comprising:
   a crystal analyzer having a radius of curvature that defines a Rowland circle;
   a sample stage configured to support a sample such that the sample is offset from the Rowland circle;

an x-ray source configured to emit unfocused x-rays toward the sample stage; and a position-sensitive detector that is tangent to the Rowland circle.

2. The spectrometer of claim 1, wherein the crystal analyzer has a Johann geometry or a Johansson geometry.

3. The spectrometer of claim 1, wherein the sample stage is configured to support the sample such that the sample is inside of the Rowland circle.

4. The spectrometer of claim 1, wherein the sample stage is configured to support the sample such that the sample is outside of the Rowland circle.

5. The spectrometer of claim 1, wherein the x-ray source is configured to emit x-rays having a spot size on a sample, when present, that is at least 0.1 mm in diameter.

6. The spectrometer of claim 1, wherein the position-sensitive detector comprises a charge-coupled device, a CMOS camera, a stripline detector, a diode array, a phosphorus screen, a spectroscopic camera, or a position-sensitive proportional counter.

7. The spectrometer of claim 1, wherein the crystal analyzer is configured to redirect, via Bragg reflection, x-rays having a first wavelength coming from different directions to a first position on the position-sensitive detector.

8. The spectrometer of claim 7, wherein the crystal analyzer is configured to redirect, via Bragg reflection, additional x-rays having a second wavelength coming from different directions to a second position on the position-sensitive detector, wherein the second wavelength is different from the first wavelength and the first position on the position-sensitive detector is different from the second position on the position-sensitive detector.

9. The spectrometer of claim 1, wherein the spectrometer is integrated into or configured to operate within a glove box or a fume hood.

10. The spectrometer of claim 1, wherein the spectrometer is operable to distinguish between x-rays having an energy difference as small as 1 electron-volt (eV).

11. The spectrometer of claim 1, wherein the crystal analyzer and the position-sensitive detector are configured to rotate in unison with respect to the sample stage.

12. The spectrometer of claim 1, wherein the x-ray source is configured to emit the unfocused x-rays toward the sample stage such that, when the sample is present, the unfocused x-rays are incident upon a surface of the sample that faces the crystal analyzer.

13. The spectrometer of claim 1, wherein the x-ray source is configured to emit the unfocused x-rays toward the sample stage such that, when the sample is present, the unfocused x-rays are incident upon a surface of the sample that faces away from the crystal analyzer.

14. The spectrometer of claim 1, wherein the spectrometer is configured such that, for any wavelength of x-ray that originates from the sample stage, there exists an exclusive region of the crystal analyzer that corresponds to that wavelength at which the x-ray could both satisfy a Bragg condition of the crystal analyzer and be redirected by the crystal analyzer to the position-sensitive detector.

15. A method performed via a spectrometer having a crystal analyzer with a radius of curvature that defines a Rowland circle, the method comprising:

emitting, via an x-ray source, unfocused x-rays toward a sample that is mounted on a sample stage such that the sample is offset from the Rowland Circle, thereby causing the sample to emit x-rays that impinge on the crystal analyzer or transmit a portion of the unfocused x-rays to impinge on the crystal analyzer;

redirecting, via the crystal analyzer and via Bragg reflection, the x-rays that impinge on the crystal analyzer; and detecting the redirected x-rays via a position-sensitive detector that is tangent to the Rowland circle.

16. The method of claim 15, wherein emitting the unfocused x-rays comprises emitting the unfocused x-rays such that the unfocused x-rays are incident upon a surface of the sample that faces the crystal analyzer.

17. A computer-readable medium storing instructions, that when executed by a processor electrically coupled with a spectrometer, cause the spectrometer to perform the method of claim 15.

18. The method of claim 15, wherein the method is performed to determine a distribution of nominal oxidation states, identify provenance, and/or examine local chemistries of sulfur in oil shales, crude oil solids, crude oil liquids, refined crude oil products, processed or unprocessed oil shale, coal, coal ash, fly ash, biochars, soil, pigments, gem stones, or sulfur-containing materials that react with air.

19. The method of claim 15, wherein the method is performed to determine a distribution of nominal oxidation states, identify provenance, and/or examine local chemistries of phosphorus in biochars, lubricants, soil, phosphate-rich ores, or phosphorous-containing materials that react with air.

20. The method of claim 15, wherein the method is performed to determine a distribution of nominal oxidation states, identify provenance, and/or examine local chemistries of technetium in waste stream products from nuclear fuel processing or recovery, environmental samples showing technetium contamination, or technetium-containing materials that react with air.

* * * * *